US012119190B2

(12) United States Patent
Yoo

(10) Patent No.: US 12,119,190 B2
(45) **Date of Patent: *Oct. 15, 2024**

(54) DIRECT CURRENT RELAY

(71) Applicant: LS ELECTRIC CO., LTD., Anyang-si (KR)

(72) Inventor: Jungwoo Yoo, Anyang-si (KR)

(73) Assignee: LS ELECTRIC CO., LTD., Anyang-si (KR)

(*) Notice: Subject to any disclaimer, the term of this patent is extended or adjusted under 35 U.S.C. 154(b) by 417 days.

This patent is subject to a terminal disclaimer.

(21) Appl. No.: 17/612,423

(22) PCT Filed: Aug. 20, 2019

(86) PCT No.: PCT/KR2019/010551

§ 371 (c)(1),
(2) Date: Nov. 19, 2021

(87) PCT Pub. No.: WO2020/241968

PCT Pub. Date: Dec. 3, 2020

(65) Prior Publication Data

US 2022/0230826 A1 Jul. 21, 2022

(30) Foreign Application Priority Data

May 29, 2019 (KR) ........................ 10-2019-0063323

(51) Int. Cl.
*H01H 47/02* (2006.01)
*H01H 50/36* (2006.01)
*H01H 50/54* (2006.01)

(52) U.S. Cl.
CPC ............ *H01H 47/02* (2013.01); *H01H 50/36* (2013.01); *H01H 50/54* (2013.01)

(58) Field of Classification Search
CPC ......... H01H 47/02; H01H 50/36; H01H 50/54
(Continued)

(56) References Cited

U.S. PATENT DOCUMENTS 8,653,913 B2 * 2/2014 Vellaiyanaicken .......................... H01H 51/2209 335/229
9,431,200 B2 * 8/2016 Choi ...................... H01H 50/30
(Continued)

FOREIGN PATENT DOCUMENTS

CN 105359243 A 2/2016
CN 107507738 A 12/2017
(Continued)

OTHER PUBLICATIONS

International Search Report for related International Application No. PCT/KR2019/010551; report dated Dec. 3, 2020; (5 pages).
(Continued)

*Primary Examiner* — Alexander Talpalatski
(74) *Attorney, Agent, or Firm* — K&L Gates LLP

(57) ABSTRACT

A direct current relay is disclosed. A movable contact part provided on a direct current relay, according to an embodiment of the present disclosure, comprises a movable contact and a pin member that is through-coupled to the movable contact. The movable contact can be supported by the pin member and simultaneously move on a straight line along the pin member. Therefore, even when a physical force is applied to the movable contact, the movable contact does not arbitrarily separate therefrom. The pin member is coupled to a support member insertion-coupled to a housing and an upper yoke. The pin member is formed to have a diameter larger than that of a hollow formed in the support member. The pin member can be insertion-coupled to the support member. Therefore, arbitrary separation of the movable contact can be prevented even without a separate fastening member.

10 Claims, 22 Drawing Sheets

(58) Field of Classification Search
USPC .......................................... 335/131, 185, 195
See application file for complete search history.

(56) References Cited

U.S. PATENT DOCUMENTS

| | | | | |
|---|---|---|---|---|
| 9,496,109 | B2 * | 11/2016 | Lee | H01H 50/34 |
| 10,090,127 | B2 * | 10/2018 | Ito | H01H 50/56 |
| 11,735,386 | B2 * | 8/2023 | Zhou | H01H 50/041 335/195 |
| 11,830,694 | B2 * | 11/2023 | Yoo | H01H 50/44 |
| 2004/0080389 | A1 | 4/2004 | Takeshi et al. | |
| 2014/0184366 | A1 | 7/2014 | Masahiro et al. | |
| 2016/0155592 | A1 | 6/2016 | Masahiro et al. | |
| 2022/0139655 | A1 * | 5/2022 | Hoffmann | H01H 50/546 335/131 |

FOREIGN PATENT DOCUMENTS

| | | | |
|---|---|---|---|
| FR | 3071678 | A1 | 3/2019 |
| JP | 2009016276 | A | 1/2009 |
| JP | 2012022983 | A | 2/2012 |
| JP | 2012199126 | A | 10/2012 |
| JP | 2014132595 | A | 7/2014 |
| JP | 2017224440 | A | 12/2017 |
| JP | 2018133347 | A | 8/2018 |
| KR | 200456811 | Y1 | 11/2011 |
| KR | 101216824 | B1 | 12/2012 |
| KR | 20140001388 | U | 3/2014 |
| KR | 101519784 | B1 | 5/2015 |
| WO | 2014208098 | A1 | 2/2017 |

OTHER PUBLICATIONS

Written Opinion for related International Application No. PCT/KR2019/010551; report dated Dec. 3, 2020; (4 pages).
Notice of Allowance for related Japanese Application No. 2021-565807; action dated Apr. 4, 2023; (3 pages).
Extended European Search Report for related European Application No. 19931261.2; action dated Jun. 5, 2023; (7 Pages).
Office Action for related Chinese Application No. 201980094483.7; action dated Mar. 20, 2024; (7 pages).

* cited by examiner (a)

(b)

(a)

(b)

(a)

(b)

(a)

(b)

(a) (b)

DIRECT CURRENT RELAY

CROSS-REFERENCE TO RELATED APPLICATIONS

This application is the National Stage filing under 35 U.S.C. 371 of International Application No. PCT/KR2019/010551, filed on Aug. 20, 2019, which claims the benefit of earlier filing date of and right of priority to Korean Application No. 10-2019-0063323 filed on May 29, 2019, the contents of which are all hereby incorporated by reference herein in their entirety.

FIELD

The present disclosure relates to a direct current (DC) relay, and more particularly, to a DC relay having a structure capable of stably maintaining a coupled state of a movable contactor that comes in contact with or is spaced apart from a fixed contactor.

BACKGROUND

A direct current (DC) relay is a device that transmits a mechanical driving signal or a current signal using the principle of an electromagnet. The DC relay is also called a magnetic switch, and generally classified as an electrical circuit switching device.

The DC relay may be operated by receiving external control power. The DC relay includes a fixed core and a movable core that can be magnetized by the control power. The fixed core and the movable core are located adjacent to a bobbin on which a plurality of coils are wound.

When control power is applied, the plurality of coils generate an electromagnetic field. The fixed core and the movable core are magnetized by the electromagnetic field, and electromagnetic attractive force attractive force is generated between the fixed core and the movable core.

Since the fixed core is stationary, the movable core is moved toward the fixed core. One side of a shaft member is connected to the movable core. Further, another side of the shaft member is connected to a movable contactor.

When the movable core is moved toward the fixed core, the shaft member and the movable contactor connected to the shaft member are also moved. Responsive to the movement, the movable contactor is moved toward a fixed contactor. When the movable contactor and the fixed contactor are brought into contact with each other, the DC relay is electrically connected to an external s power supply and a load.

Referring to FIGS. 1 and 2, a DC relay 1000 according to the related art includes a frame part 1100, a contact part 1200, an actuator 1300, and a movable contact moving part 1400.

The frame part 1100 may define appearance of the DC relay 1000. A predetermined space is defined inside the frame part 1100 to accommodate the contact part 1200, the actuator 1300, and the movable contact moving part 1400.

When control power is applied from outside, coils 1310 wound around a bobbin 1320 of the actuator 1300 generate an electromagnetic field. A fixed core 1330 and a movable core 1340 are magnetized by the electromagnetic field. is Since the fixed core 1330 is stationary, the movable core 1340 and a movable shaft 1350 connected to the movable core 1340 are moved toward the fixed core 1330.

At this time, the movable shaft 1350 is also connected to a movable contact 1220 of the contact part 1200. Accordingly, by the movement of the movable core 1340, the movable contact 1220 and a fixed contact 1210 are brought into contact to be electrically connected to each other.

When the application of the control power is released, the coils 1310 no longer form the electromagnetic field. Accordingly, electromagnetic attractive force attractive force between the movable core 1340 and the fixed core 1330 disappears. A spring 1360 compressed due to the movement of the movable core 1340 is tensioned, and the movable core 1340, the movable shaft 1350 connected to the movable core 1340, and the movable contact 1220 are all moved downward.

The movable contact 1220 is coupled to the movable contact moving part 1400. The movable contact moving part 1400 is moved up and down in response to the movement of the movable core 1340.

The movable contact moving part 1400 includes a movable contact supporting portion 1410 for supporting the movable contact 1220, and an elastic portion 1430 for elastically supporting the movable contact 1220. In addition, a movable contact cover portion 1420 is provided on an upper side of the movable contact 1220 to protect the movable contact 1220.

However, in the movable contact moving part 1400 according to the related art, the movable contact 1220 is only elastically supported by the elastic portion 1430. That is, a separate member for preventing the movable contact 1220 from being separated from the movable contact moving part 1400 is not provided.

When the fixed contact 1210 and the movable contact 1220 are in contact with each other, electromagnetic repulsive force is generated as current flows. 10-1216824 from the fixed contact 1210.

In this case, even when control power is applied, the DC relay 1000 is not electrically connected, which may cause malfunction or failure.

Korean Patent Registration No. 10-1216824 discloses a DC relay having a structure that can prevent separation between a movable contact and a fixed contact. Specifically, the patent document discloses a DC relay having a structure in which a separate damping magnet for canceling electromagnetic repulsive force generated between a movable contact and a fixed contact is provided adjacent to a fixed contact.

However, this type of DC relay has a limitation in that it includes only a configuration for canceling electromagnetic force. In other words, it is difficult to find a study on countermeasures to prevent the movable contact from being arbitrarily separated from the fixed contact due to incomplete cancellation of the electromagnetic force.

Korean Registration Utility Model No. 20-0456811 discloses a DC relay having a structure capable of coupling a permanent magnet located adjacent to a fixed contact in a desired direction. Specifically, the patent document discloses a DC relay having a structure in which a groove is formed in a permanent magnet and a protrusion is formed in a case in which the permanent magnet is accommodated so that the permanent magnet is accommodated only in a direction in which the groove and the protrusion are engaged with each other.

However, this type of DC relay also has a limitation in that it includes only a configuration for canceling electromagnetic force.

In addition, these types of DC relays have a limitation in that there is no consideration for measures to prevent arbitrary separation of the movable contact while the movable contact moves up and down.

Furthermore, these types of DC relays do not suggest a method for simply realizing coupling between the movable contact and members disposed adjacent to the movable contact.

Korea Patent Registration Application No. 10-1216824 (Dec. 28, 2012)

Korean Registration Utility Model No. 20-0456811 (Nov. 21, 2011)

SUMMARY

The present disclosure is directed to providing a DC relay having a structure capable of solving those problems and other drawbacks, and a method for manufacturing the same.

First, one aspect of the present disclosure is to provide a DC relay having a structure capable of preventing arbitrary separation of a movable contactor even though the movable contactor is moved up and down.

Another aspect of the present disclosure is to provide a DC relay having a structure capable of effectively canceling electromagnetic repulsive force generated between a movable contactor and a fixed contactor.

Still another aspect of the present disclosure is to provide a DC relay having a structure capable of stably coupling a movable contactor with a member for canceling electromagnetic repulsive force generated between the movable contactor and a fixed contactor.

Still another aspect of the present disclosure is to provide a DC relay having a structure that does not require an additional member for coupling a movable contactor and a member for canceling electromagnetic repulsive force generated between the movable contactor and a fixed contactor.

Still another aspect of the present disclosure is to provide a DC relay having a structure in which a member for offsetting electromagnetic repulsive force, a member for coupling a housing, and a member for preventing arbitrary separation of a movable contactor can be coupled without a separate coupling member.

Still another aspect of the present disclosure is to provide a DC relay having a structure in which a member for accommodating a movable contactor and a member for canceling electromagnetic repulsive force can be stably coupled to each other.

Still another aspect of the present disclosure is to provide a DC relay having a structure capable of facilitating coupling among a member for preventing separation of a movable contactor, the movable contactor, a member for accommodating the movable contactor, and a member for canceling electromagnetic repulsive force.

In order to achieve these and other advantages and in accordance with the purpose of this specification, as embodied and broadly described herein, there is provided a Direct Current (DC) relay that may include a fixed contactor, a movable contactor brought into contact with or separated from the fixed contactor to be electrically connected to or disconnected from the fixed contactor, is an upper yoke located on an upper side of the movable contactor to cancel electromagnetic repulsive force generated between the fixed contactor and the movable contactor, a support member coupled to the upper yoke and the movable contactor such that the upper yoke and the movable contactor are coupled to each other, and a pin member coupled through the support member to support the movable contactor.

The support member may extend in a height direction, and a first hollow portion and a second hollow portion having a smaller diameter than the first hollow portion may be formed through an inside of the support member in the height direction.

An outer circumferential surface of the pin member may be brought into contact with a pin member contact surface surrounding the second hollow portion when the pin member is coupled through the support member.

The pin member may extend in a longitudinal direction, and the pin member may include a first end portion constituting one end portion of an outer circumference of the pin member, and a second end portion opposite to the first end portion, spaced apart from the first end portion by a predetermined distance, and constituting another end portion of the outer circumference of the pin member.

The distance between the first end portion and the second end portion may be reduced and an outer diameter of the pin member may be reduced accordingly when radially inward pressure is applied to the pin member.

An outer diameter of the pin member may be larger than a diameter of the second hollow portion.

The DC relay may further include a lower yoke located on a lower side of the movable contactor to cancel electromagnetic repulsive force generated between the fixed contactor and the movable contactor, and electromagnetic attractive force may be generated between the upper yoke and the lower yoke when the fixed contactor and the movable contactor are in contact to be electrically connected to each other.

The movable contactor may include a coupling protrusion protruding toward the lower yoke, and the lower yoke may include a movable contactor coupling portion recessed by a predetermined distance into one surface of the lower yoke facing the movable contactor to surround the coupling protrusion. A diameter of the coupling protrusion may be smaller than a diameter of the movable contactor coupling portion.

The diameter of the coupling protrusion may be increased so that an outer circumferential surface of the coupling protrusion is brought into contact with a yoke inner circumferential surface surrounding the movable contactor coupling portion when radially outward pressure is applied to the coupling protrusion.

The DC relay may further include a housing located between the movable contactor and the upper yoke to accommodate the movable contactor, and the upper yoke may surround the housing.

The DC relay may further include a housing located on an upper side of the upper yoke to surround the upper yoke.

According to the present disclosure, the following effects can be achieved.

First, a pin member may be coupled through a movable contactor. The pin member may be spaced apart from the movable contactor by a predetermined distance.

Accordingly, the movable contactor can be moved toward or away from a fixed contactor in a state in which the pin member is coupled through the movable contactor. Also, since the pin member is coupled through the movable contactor to support the movable contactor, arbitrary separation of the movable contactor can be prevented.

An upper yoke may be provided on an upper side of the movable contactor. A lower yoke may be provided on a lower side of the movable contactor. When the movable contactor is electrically connected to the fixed contactor, the upper yoke and the lower yoke may be magnetized to generate electromagnetic attractive force therebetween.

Accordingly, even if electromagnetic repulsive force is generated between the movable contactor and the fixed contactor, the force may be canceled by the electromagnetic attractive force between the upper yoke and the lower yoke. Therefore, the contact state between the movable contactor and the fixed contactor can be stably maintained.

A coupling protrusion may protrude from the lower side of the movable contactor. The coupling protrusion may be inserted into a movable contactor coupling portion recessed in the lower yoke. After the coupling protrusion is inserted into the movable contactor coupling portion, the coupling protrusion may receive radially outward pressure.

Accordingly, the coupling protrusion may be expanded and its outer diameter may be increased, so as to be fitted to the movable contactor coupling portion. Therefore, the movable contactor and the lower yoke can be stably coupled to each other. Furthermore, the movable contactor and the lower yoke can be coupled to each other without a separate coupling member.

The upper yoke and a housing may be coupled to each other by a support member. The support member may be coupled through the upper yoke and the housing. A base portion formed on a lower side of the support member may be seated on the upper side of the movable contactor.

Accordingly, the upper yoke and the housing can be stably coupled to each other.

After the support member is coupled through the upper yoke and the housing, the support member may receive radially outward pressure. The support member may be expanded radially outward by the pressure. As the support member is expanded radially outward, an outer circumferential surface of the support member may be fitted to inner circumferential surfaces of the upper yoke and the housing.

Accordingly, a separate member for coupling the support member to the upper yoke and the housing may not be required.

In addition, before the pin member is coupled through the support member, the pin member may receive radially inward pressure. A cutout portion may be formed in an outer circumferential portion of the pin member, and thus an outer diameter of the pin member may be reduced by the pressure. When the pin member is coupled through the support member, the pressure may be released.

Accordingly, the pin member may be expanded radially outward while being restored to its original shape. Thus, the pin member can be fitted to the support member. This may allow the coupling between the pin member and the support member even without a separate coupling member.

DETAILED DESCRIPTION

Hereinafter, a DC relay according to an implementation of the present disclosure will be described in detail with reference to the accompanying drawings.

In the following description, descriptions of some components may be omitted to help understanding of the present disclosure.

1. Definition of Terms

It will be understood that when an element is referred to as being "connected with" another element, the element can be connected with the another s element or intervening elements may also be present.

In contrast, when an element is referred to as being "directly connected with" another element, there are no intervening elements present.

A singular representation used herein may include a plural representation unless it represents a definitely different meaning from the context.

2. Description of Configuration of DC Relay According to Implementation

Figure 1:
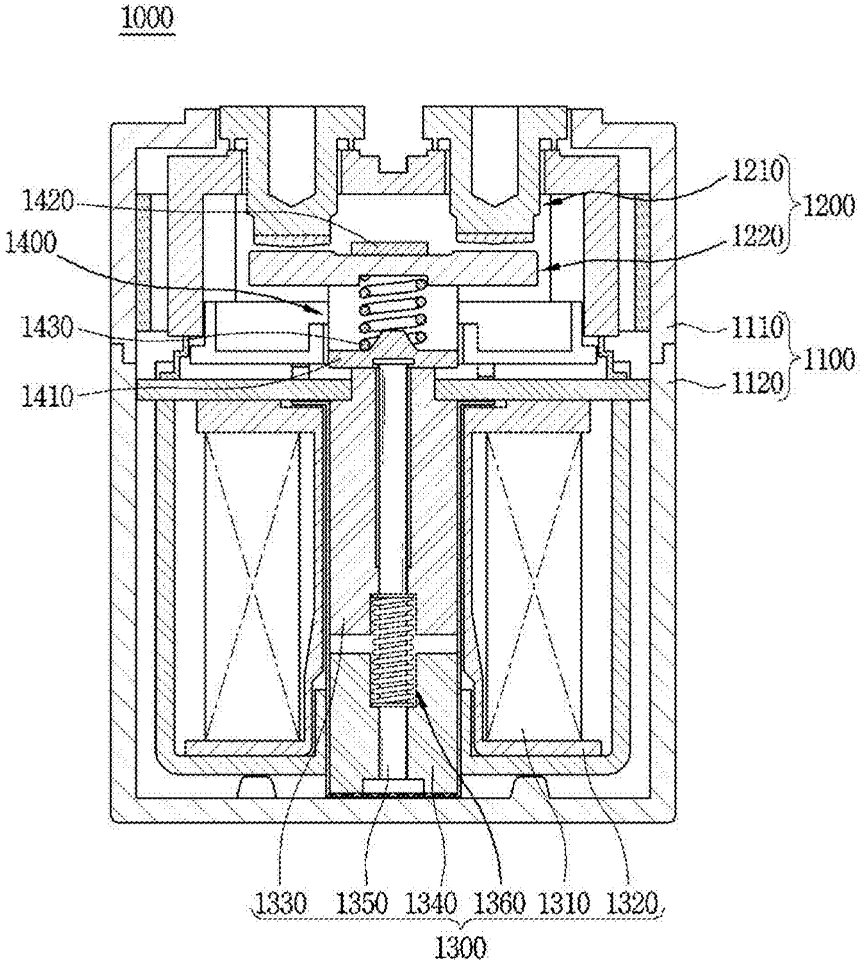
FIG. 1 PRIOR ART
FIG. 1 is a cross-sectional view of a DC relay according to the related art.
Figure 2:
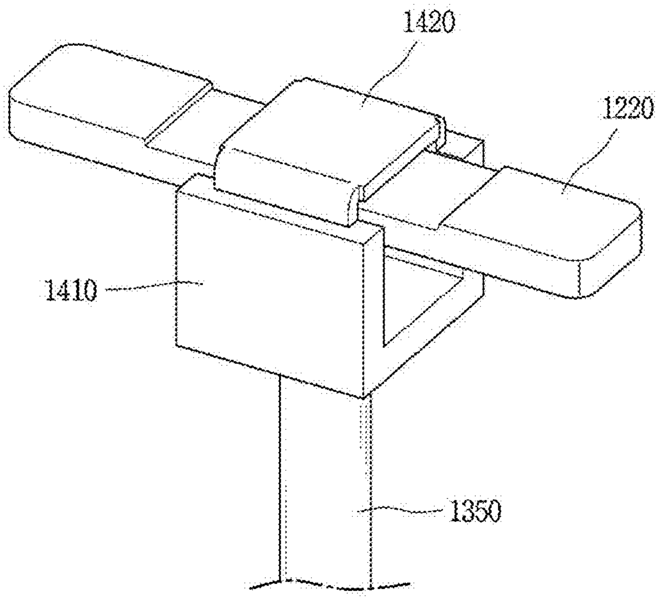
FIG. 2 PRIOR ART
FIG. 2 is a perspective view of a mover assembly provided in the DC relay is of FIG. 1.
Figure 3:
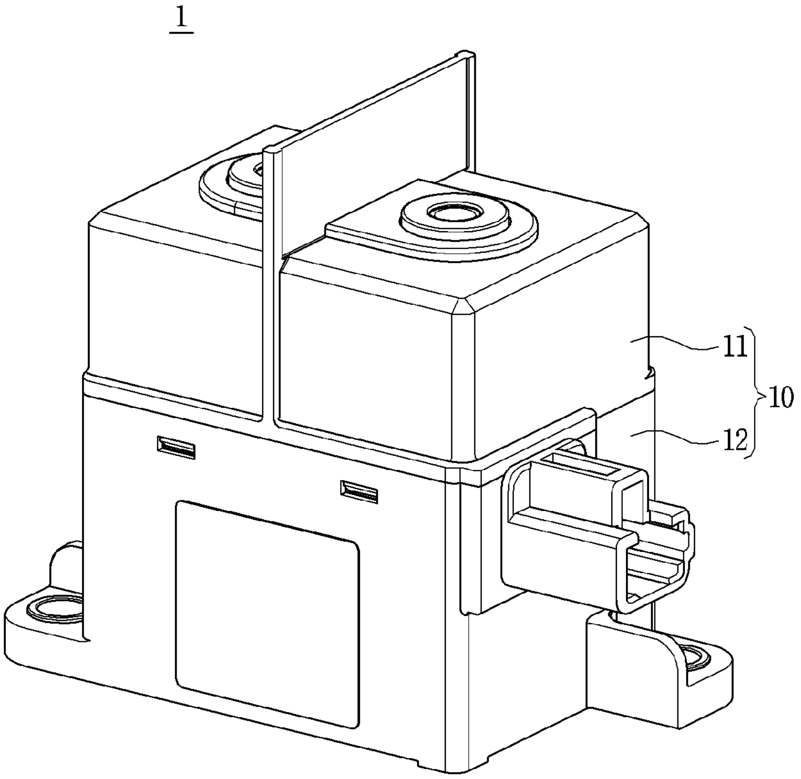
FIG. 3 is a perspective view of a DC relay in accordance with one implementation of the present disclosure.
Figure 4:
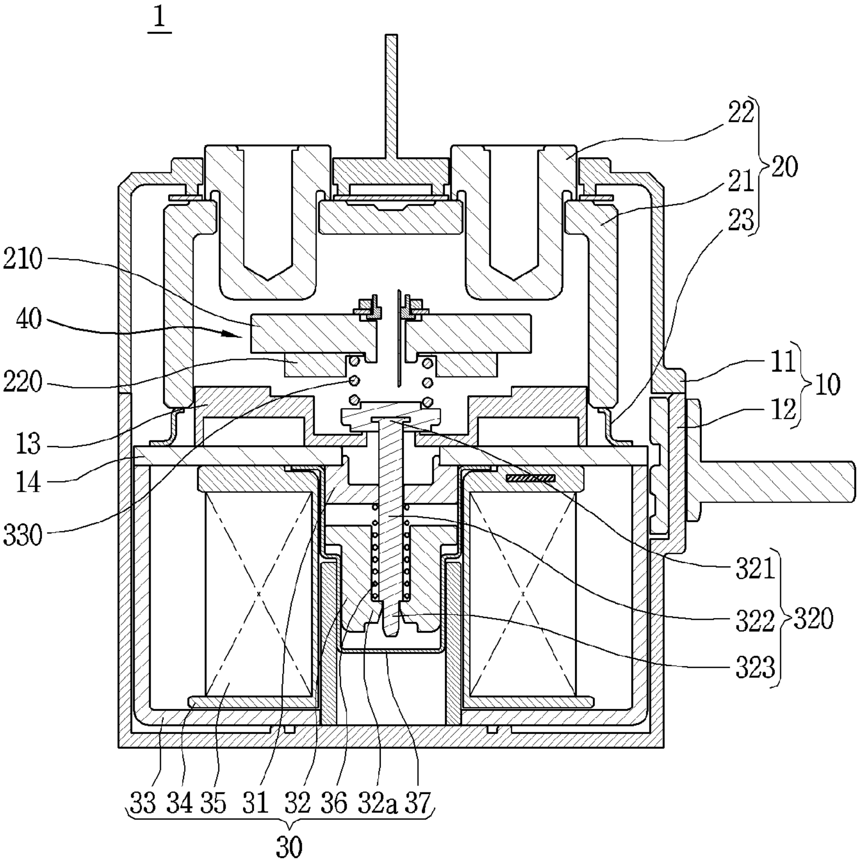
FIG. 4 is a cross-sectional view illustrating an inner configuration of the DC relay of FIG. 3.
Figure 5:
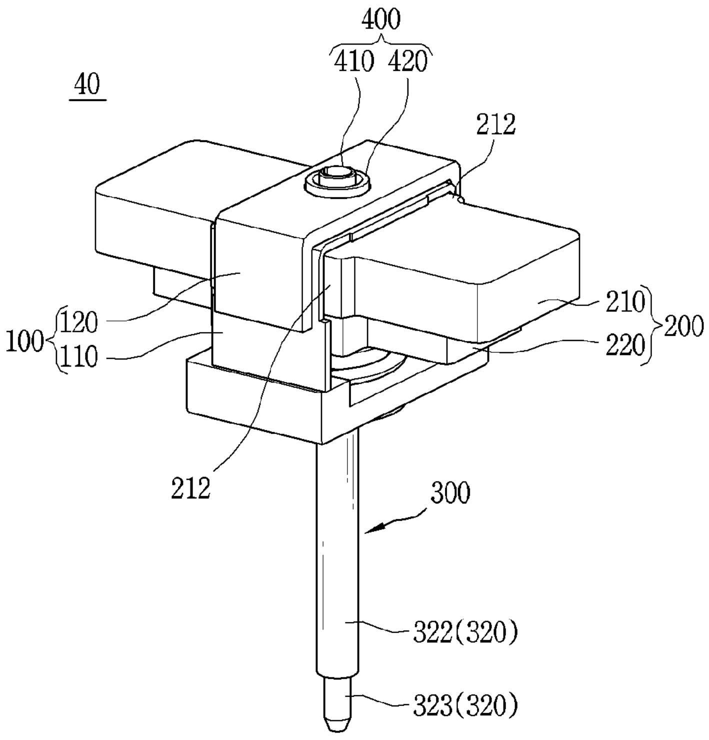
FIG. 5 is a perspective view illustrating a movable contactor part provided in a DC relay in accordance with one implementation of the present disclosure.
Figure 6:
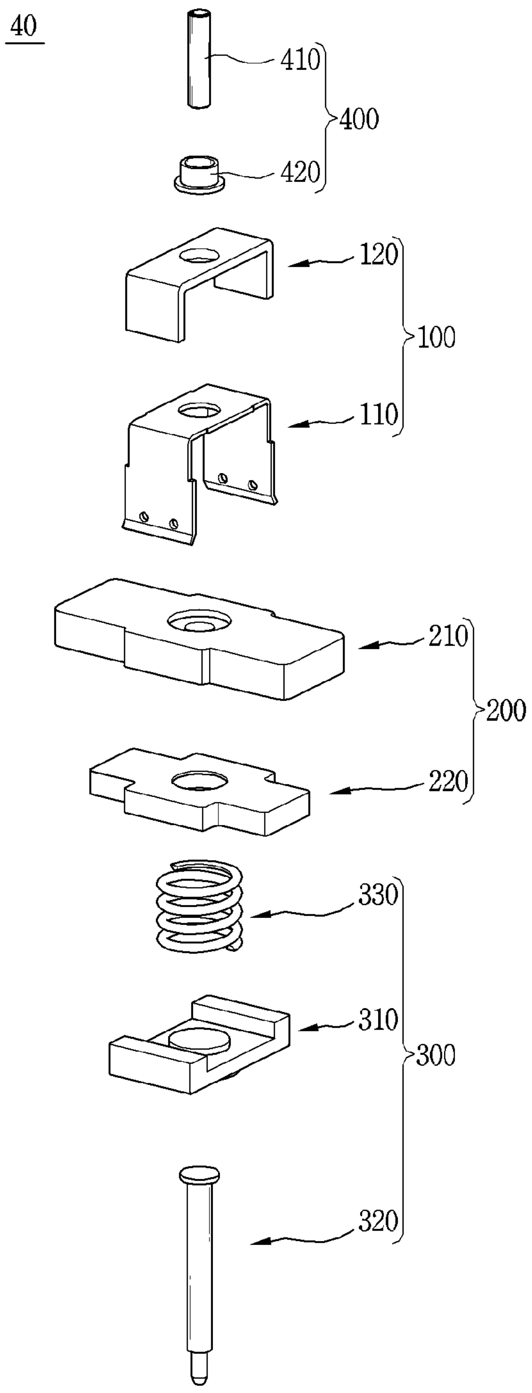
FIG. 6 is an exploded perspective view of the movable contactor part of FIG. 5.
Figure 7:
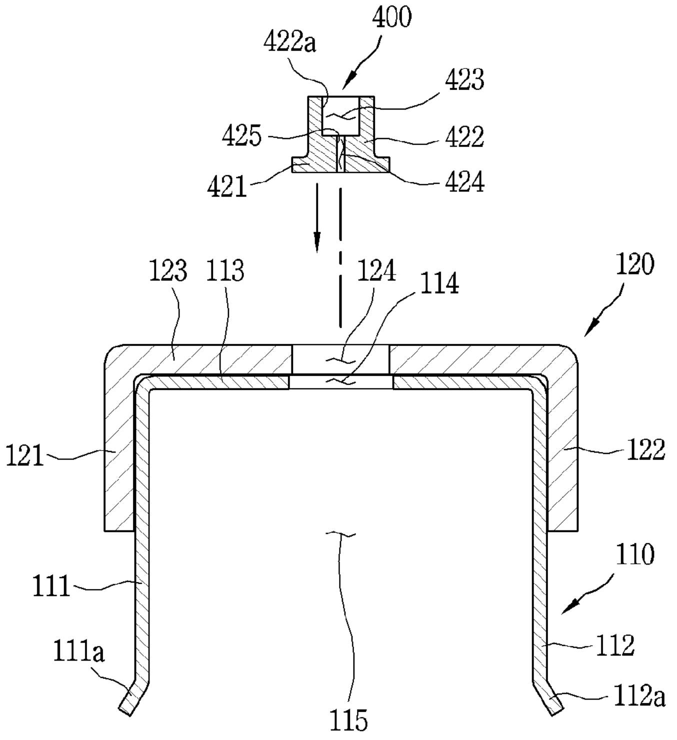
FIG. 7 is a cross-sectional view illustrating a state (a) before coupling an upper yoke and a housing provided in the movable contactor part of FIG. 5 and a state (b) after coupling.
Figure 7:
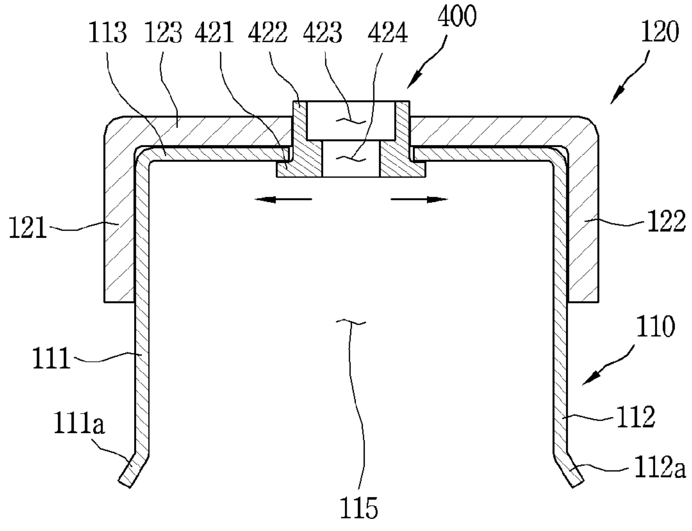
Figure 8:
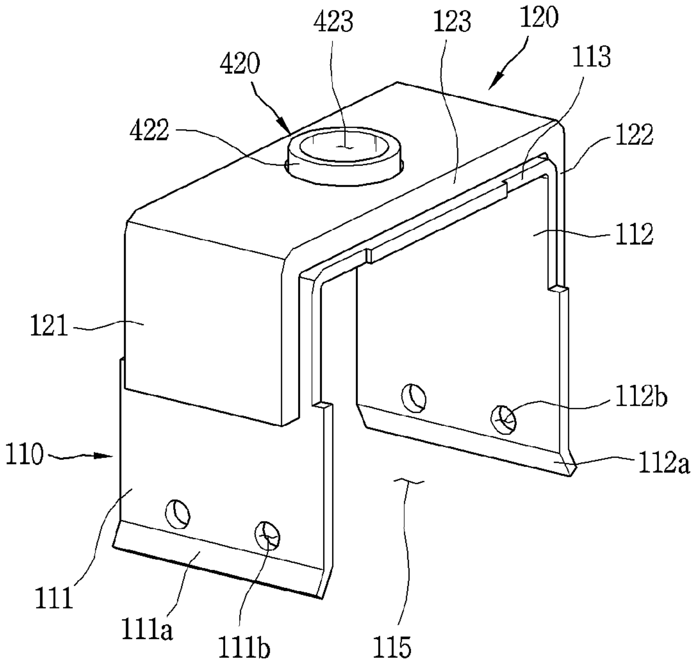
FIG. 8 is a perspective view illustrating a state in which the upper yoke and the housing provided in the movable contactor part of FIG. 5 are coupled to each other.

Referring to FIGS. 3 and 4, a DC relay 1 according to an implementation of the present disclosure may include a frame part 10, an opening/closing part 20, and a core part 30.

In addition, the DC relay 1 according to the implementation of the present is disclosure may further include a movable contactor part 40 having a structure for improving reliability of application and blocking of current.

Hereinafter, the DC relay 1 according to the implementation of the present disclosure will be described with reference to FIGS. 3 and 4 but the movable contactor part 40 will be described as a separate clause.

(1) Description of Frame Part 10

The frame part 10 may define appearance of the DC relay 1. A predetermined space may be defined inside the frame part 10. Various devices for the DC relay 1 to perform functions for applying or cutting off current may be accommodated in the space. That is, the frame part 10 may function as a kind of housing.

The frame part 10 may be formed of an insulating material such as synthetic resin. This may prevent inside and outside of the frame part 10 from being arbitrarily electrically connected to each other.

The frame part 10 may include an upper frame 11, a lower frame 12, an insulating plate 13, and a supporting plate 14.

The upper frame 11 may define an upper side of the frame part 10. The opening/closing part 20 and the movable contactor part 40 may be accommodated in an inner space of the upper frame 11.

The upper frame 11 may be coupled to the lower frame 12. The insulating to plate 13 and the supporting plate 14 may be interposed between the upper frame 11 and the lower frame 12. The insulating plate 13 and the supporting plate 14 may electrically and physically isolate the inner space of the upper frame 11 and an inner space of the lower frame 12 from each other.

A fixed contactor 22 of the opening/closing part 20 may be provided on one side of the upper frame 11, for example, on an upper side of the upper frame 11 in the illustrated implementation. The fixed contactor 22 may be partially exposed to the upper side of the upper frame 11, to be electrically connected to an external power supply or a load.

The lower frame 12 may define a lower side of the frame part 10. The core part 30 may be accommodated in the inner space of the lower frame 12.

The lower frame 12 may be coupled to the upper frame 11. The insulating plate 13 and the supporting plate 14 may be interposed between the lower frame 12 and the upper frame 11. The insulating plate 13 and the supporting plate 14 may electrically and physically isolate the inner space of the lower frame 12 and the inner space of the upper frame 11 from each other.

The insulating plate 13 may be located between the upper frame 11 and the lower frame 12. The insulating plate 13 may allow the upper frame 11 and the lower frame 12 to be electrically spaced apart from each other.

This may result in preventing arbitrary electric connection between the opening/closing part 20 and the movable contactor part 40 accommodated in the upper frame 11 and the core part 30 accommodated in the lower frame 12.

A through hole (not shown) may be formed through a central portion of the insulating plate 13. A shaft 320 of a lower assembly 300 may be coupled through the through hole (not shown) to be movable up and down.

The insulating plate 13 may be supported by the supporting plate 14.

The supporting plate 14 may be located between the upper frame 11 and the lower frame 12. The supporting plate 14 may allow the upper frame 11 and the lower frame 12 to be electrically spaced apart from each other.

In addition, the supporting plate 14 may be formed of a magnetic material so as to configure a magnetic circuit together with a yoke 33 of the core part 30.

A through hole (not shown) may be formed through a central portion of the supporting plate 14. The shaft 320 may be coupled through the through hole (not shown) to be movable up and down.

(2) Description of Opening/Closing Part 20

The opening/closing unit 20 may make current applied to or cut off from the DC relay 1 according to an operation of the core part 30. Specifically, the opening/closing part 20 may allow or block an application of current as the fixed contactor 22 and the movable contactor 210 are brought into contact with or separated from each other.

The opening/closing part 20 may be accommodated in the upper frame 11. The opening/closing part 20 may be electrically and physically isolated from the core part 30 by the insulating plate 13 and the supporting plate 14.

The opening/closing part 20 may include an arc chamber 21, a fixed contactor 22, and a sealing member 23. Also, although not shown, the opening/closing part 20 may include a plurality of magnets. The plurality of magnets (not shown) may generate a magnetic field inside the arc chamber 21 to control shape and discharge path of arc generated.

The arc chamber 21 may be configured to extinguish arc generated as the fixed contactor 22 and the movable contactor 210 are separated from each other. Therefore, the arc chamber 21 may also be referred to as an "extinguishing portion".

The arc chamber 21 may hermetically accommodate the fixed contactor 22 and the movable contactor 210. That is, the fixed contactor 22 and the movable contactor 210 may be completely accommodated in the arc chamber 21. Accordingly, the arc generated when the fixed contactor 22 and the movable contactor 210 are separated from each other may not arbitrarily leak to the outside of the arc chamber 21.

The arc chamber 21 may be filled with extinguishing gas. The extinguishing gas may extinguish the arc and may be discharged to the outside of the DC relay 1 through a preset path.

The arc chamber 21 may be formed of an insulating material. In addition, the arc chamber 21 may be formed of a material having high pressure resistance and high heat resistance. In one implementation, the arc chamber 21 may be formed of a ceramic material.

A plurality of through holes (not shown) may be formed through an upper side of the arc chamber 21. The fixed contactor 22 may be coupled through each of the through holes (not shown). The fixed contactor 22 may be hermetically coupled to the through hole (not shown). Accordingly, the generated arc cannot be externally discharged through the through hole (not shown).

A lower side of the arc chamber 21 may be open. The insulating plate 13 may come in contact with the lower side of the arc chamber 21. In addition, a sealing member 23 may come in contact with the lower side of the arc chamber 21. Accordingly, the arc chamber 21 can be electrically and physically isolated from an outer space of the upper frame 11.

As a result, an inside of the arc chamber 21 may be sealed by the insulating plate 13, the supporting plate 14, the fixed contactor 22, the sealing member 23, and a shaft support member 310 of the movable contactor part 40.

The arc extinguished in the arc chamber 21 may be discharged to the outside of the DC relay 1 through a preset path.

The fixed contactor 22 may be brought into contact with or separated from the movable contactor 210, so as to electrically connect or disconnect the inside and the outside of the DC relay 1.

Specifically, when the fixed contactor 22 is brought into contact with the movable contactor 210, the inside and the outside of the DC relay 1 may be electrically connected. On the other hand, when the fixed contactor 22 is separated from the movable contactor 210, the electric connection between the inside and the outside of the DC relay 1 may be released.

As the name implies, the fixed contactor 22 does not move. That is, the fixed contactor 22 may be fixedly coupled to the upper frame 11 and the arc chamber 21. Accordingly, the contact and separation between the fixed contactor 22 and the movable contactor 210 may be implemented by the movement of the movable contactor 210.

One end portion of the fixed contactor 22, for example, an upper end portion in the illustrated implementation, may be exposed to the outside of the upper frame 11. A power supply or a load may be electrically connected to the one end portion.

The fixed contactor 22 may be provided in plurality. In the illustrated implementation, the fixed contactor 22 may be provided as a pair, i.e., by two. A power supply may be electrically connected to one of the fixed contacts 22, and a load may be electrically connected to the other fixed contactor 22.

Another end portion of each fixed contactor 22, for example, a lower end portion in the illustrated implementation may extend toward the movable contactor 210. When the movable contactor 210 moves upward, the lower end portion of the fixed contactor 22 may be brought into contact with the movable contactor 210. Accordingly, the outside and the inside of the DC relay 1 can be electrically connected.

The another end portion of the fixed contactor 22 may be located inside the arc chamber 21. That is, the another end portion of the fixed contactor 22 may be sealed by the arc chamber 21.

When control power is cut off, the movable contactor 210 may be separated from the fixed contactor 22 by elastic force of a return spring 36. At this time, as the fixed contactor 22 and the movable contactor 210 are separated from each other, the arc may be generated between the fixed contactor 22 and the movable contactor 210. The generated arc may be extinguished by the extinguishing gas inside the arc chamber 21 and discharged to the outside.

The sealing member 23 may block communication between the arc chamber 21 and the inside of the upper frame 11. The sealing member 23 may seal the lower side of the arc chamber 21 together with the supporting plate 14.

Specifically, a lower side of the sealing member 23 may be coupled to the s supporting plate 14. In addition, an upper side of the sealing member 23 may be coupled to the lower side of the arc chamber 21.

Accordingly, arc generated in the arc chamber 21 and arc extinguished by the extinguishing gas may not flow into the inner space of the upper frame 11.

In addition, the sealing member 23 may prevent an inner space of a cylinder 37 from communicating with the inner space of the frame part 10.

(3) Description of Core Part 30

The core part 30 may allow the movable contactor part 40 to move upward as control power is applied. In addition, when the control power is not applied any more, the core part 30 may allow the movable contactor part 40 to move downward again.

The core part 30 may be electrically connected to the outside of the DC relay 1. The core part 30 may receive control power from the outside through the connection.

The core part 30 may be accommodated in the lower frame 12. The core part 30 and the opening/closing part 20 may be electrically and physically spaced apart from each other by the insulating plate 13 and the supporting plate 14.

The movable contactor part 40 may be located between the core part 30 and the opening/closing part 20. The movable contactor part 40 may be moved by moving force applied by the core part 30. Accordingly, the movable contactor 210 and the fixed contactor 22 may be brought into contact with each other so that the DC relay 1 can be electrically connected.

The core part 30 may include a fixed core 31, a movable core 32, a yoke 33, a bobbin 34, coils 35, a return spring 36, and a cylinder 37.

The fixed core 31 may be magnetized by electromagnetic force generated in the coil 35 so as to generate an electromagnetic field. The movable core 32 may receive attractive force by the electromagnetic field generated in the fixed core 31, and thus move toward the fixed core 31 (toward an upper side in the illustrated implementation).

The fixed core 31 may not move. That is, the fixed core 31 may be fixedly coupled to the supporting plate 14 and the cylinder 37.

The fixed core 31 may be implemented as any member that can be magnetized by electromagnetic force. In one implementation, the fixed core 31 may be implemented as a permanent magnet or an electromagnet.

The fixed core 31 may be partially accommodated in an upper space inside the cylinder 37. Further, an outer circumference of the fixed core 31 may come in contact with an inner circumference of the cylinder 37.

The fixed core 31 may be located between the supporting plate 14 and the movable core 32.

A through hole (not shown) may be formed through a central portion of the fixed core 31. The shaft 320 may be coupled through the through hole (not shown) to be movable up and down.

The fixed core 31 may be spaced apart from the movable core 32 by a predetermined distance. The predetermined distance may be a distance at which the movable core 32 can be moved toward the fixed core 31. Accordingly, the predetermined distance may be defined as a "moving distance of the movable core 32".

One end of the return spring 36 may come in contact with a lower side of the fixed core 31. When the movable core 32 is moved upward as the fixed core 31 is magnetized, the return spring 36 may be compressed. Accordingly, when the magnetization of the fixed core 31 is finished, the movable core 32 may be moved backward again.

When control power is applied, the movable core 32 may be moved toward the fixed core 31 by receiving electromagnetic force by the electromagnetic field generated in the fixed core 31.

As the movable core 32 is moved, the shaft 320 coupled to the movable core 32 may be moved upward. In addition, as the shaft 320 is moved, the movable contactor part 40 coupled to the shaft 320 may be moved upward. Accordingly, the fixed contactor 22 and the movable contactor 210 may be brought into contact with each other so that the DC relay 1 can be electrically connected.

The movable core 32 may have any shape capable of receiving attractive force by electromagnetic force. In one implementation, the movable core 32 may be implemented as a permanent magnet or an electromagnet.

The movable core 32 may be accommodated inside the cylinder 37. In addition, the movable core 32 may be movable toward the fixed core 31 and away from the fixed core 31, namely, in the up and down (vertical) direction in the illustrated implementation, within the cylinder 37.

The movable core 32 may be coupled to the shaft 320. The movable core 32 may move integrally with the shaft 320. When the movable core 32 moves upward or downward, the shaft 320 may also move upward or downward.

The movable core 32 may be located below the fixed core 31. The movable core 32 may be spaced apart from the fixed core 31 by a predetermined distance. As described above, the predetermined distance may be defined as the moving distance of the movable core 32.

A predetermined space may be defined inside the movable core 32. Specifically, the movable core 32 may extend in a longitudinal (lengthwise) direction, and include a hollow portion extending in the longitudinal direction inside the movable core 32.

The return spring 36 and the shaft 320 coupled through the return spring 36 may be partially accommodated in the hollow portion.

Protrusions 32*a* may protrude radially inward from one side of the hollow portion opposite to the fixed core 31, namely, from a lower side of the hollow portion in the implementation. One end of the return spring 36, namely, a lower end in the implementation may be brought into contact with the protrusions 32*a*.

In addition, a movable core supporting portion 323 formed on a lower side of a shaft body portion 322 of the shaft 320 may come in contact with the protrusions 32*a*. Accordingly, when the movable core 32 is moved upward, the shaft 320 may also be moved upward.

The yoke 33 may form a magnetic circuit as control power is applied. The magnetic circuit formed by the yoke 33 may control a direction of the electromagnetic field generated by the coils 35. Accordingly, when control power is applied, the coils 35 may generate an electromagnetic field in a direction in which the movable core 32 moves toward the fixed core 31.

The yoke 33 may be accommodated inside the lower frame 12. The yoke 33 may surround the coils 35. The coils 35 may be accommodated in the yoke 33 with being spaced apart from an inner circumferential surface of the yoke 33 by a predetermined distance.

Also, the bobbin 44 may be accommodated in the yoke 33. That is, the yoke 33, the coils 35, and the bobbin 34 on which the coils 35 are wound may be sequentially located radially inward from an outer circumference of the lower frame 12.

An upper side of the yoke 33 may come in contact with the supporting plate 14. In addition, an outer circumference of the yoke 33 may come in contact with an inner circumference of the lower frame 12.

The coils 35 may be wound around the bobbin 34. The bobbin 34 may be accommodated inside the yoke 33.

The bobbin 34 may include upper and lower portions formed in a flat shape, and a cylindrical pole portion extending in the longitudinal direction to connect the upper and lower portions. That is, the bobbin 34 may have a bobbin shape.

An upper portion of the bobbin 34 may come in contact with the lower side of the supporting plate 14. In addition, a lower portion of the bobbin 34 may come in contact with an inner circumferential surface of the lower side of the lower frame 12.

The coils 35 may be wound around the pole portion of the bobbin 34. A wound thickness of the coils 35 may be the same as a diameter of the upper and lower portions of the bobbin 34.

A hollow portion may be formed through the pole portion of the bobbin 34 in the longitudinal direction. The cylinder 37 may be accommodated in the hollow portion.

The coils 35 may generate an electromagnetic field as control power is applied. The fixed core 31 may be magnetized by the electromagnetic field generated by the coils 35 and thus apply attractive force to the movable core 32.

The coils 35 may be wound around the bobbin 34. Specifically, the coils 35 may be wound on the pole portion of the bobbin 34. The coils 35 may be accommodated inside the yoke 33.

When control power is applied, the coils 35 may generate an electromagnetic field. In this case, a direction of the electromagnetic field generated by the coils 35 may be controlled by the yoke 33. The fixed core 31 may be magnetized by the electromagnetic field generated by the coils 35.

When the fixed core 31 is magnetized, the movable core 32 may receive electromagnetic force, namely, attractive force in a direction toward the fixed core 31. Accordingly, the movable core 32 may be moved toward the fixed core 31, namely, upward in the illustrated implementation.

The return spring 36 may provide driving force for the movable core 32 to be moved away from the fixed core 31 when control power is not applied any more after the movable core 32 is moved to the fixed core 31.

The return spring 36 may and store restoring force while being compressed as the movable core 32 is moved toward the fixed core 31.

At this time, the restoring force stored by the return spring 36 may preferably be smaller than the attractive force exerted by the fixed core 31 to the movable core 32. Accordingly, while control power is applied, the movable core 32 may not be returned to its original position by the return spring 36.

When control power is not applied any more, only the restoring force by the return spring 36 may be exerted to the movable core 32. Accordingly, the movable core 32 may be moved away from the fixed core 31 to be returned to the original position.

The return spring 36 may be provided in any form capable of storing restoring force by being compressed in response to the movement of the movable core 32. In one implementation, the return spring 36 may be configured as a coil spring.

A shaft 320 may be coupled through the return spring 36. The shaft 320 may move up and down regardless of the return spring 36 in a coupled state to the return spring 36.

The return spring 36 may be accommodated in the hollow portion formed through the inside of the movable core 32. In addition, one end portion of the return spring 36 facing the fixed core 31, namely, an upper end portion in the illustrated implementation may be supported with coming in contact with a lower surface of the fixed core 31.

Another end portion of the return spring 36 opposite to the one end portion, namely, a lower end portion in the illustrated implementation may be supported with coming in contact with the protrusions 32*a* formed in the lower side of the hollow portion of the movable core 32.

The cylinder 37 may accommodate the fixed core 31, the movable core 32, the coils 35, and the return spring 36. The movable core 32 may be moved upward and downward in the cylinder 37.

The cylinder 37 may be located in the hollow portion formed through the pole portion of the bobbin 34. An upper end portion of the cylinder 37 may come in contact with a lower surface of the supporting plate 14. A side surface of the cylinder 37 may come in contact with an inner circumferential surface of the pole portion of the bobbin 34. An upper opening of the cylinder 37 may be closed by the fixed core 31.

The cylinder 37 may accommodate the shaft 320. Inside the cylinder 37, the shaft 320 may be moved upward or downward together with the movable core 32.

3. Description of Movable Core Contact Part According to One Implementation

The DC relay 1 according to the implementation of the present disclosure may include a movable contactor part 40. The movable contactor part 40 may be accommodated in the frame part 10, specifically, in the inner space of the upper frame 11. In detail, the movable contactor part 40 may be accommodated in the arc chamber 21 that is accommodated in the upper frame 11.

The fixed contactor 22 may be located above the movable contactor part 40. The movable contactor part 40 may be accommodated in the arc chamber 21 to be movable toward and away from the fixed contactor 22 (i.e., movable up and down in the illustrated implementation).

The core part 30 may be located below the movable contactor part 40. The movable contactor part 40 may be accommodated to be movable toward and away from the fixed contactor 22 (i.e., movable up and down in the illustrated implementation), in response to the movement of the movable core 32.

The movable contactor part 40 may include the movable contactor 210. The movable contactor 210 may be brought into contact with or separated from the fixed contactor 22, in response to the movement of the movable core 32 of the core part 30.

In addition, the movable contactor part 40 may also include a coupling part 400 for stably maintaining a coupled state of each component of the movable contactor part 40, in addition to the configuration for the contact between the fixed contactor 22 and the movable contactor 210.

Hereinafter, a detailed description will be given of the movable contactor part 40 according to one implementation of the present disclosure, with reference to FIGS. 5 to 17.

In the illustrated implementation, the movable contactor part 40 may include an upper assembly 100, a movable contactor assembly 200, a lower assembly 300, and a coupling part 400.

(1) Description of Upper Assembly 100

The upper assembly 100 may be located on an upper side of the movable contactor part 40. The upper assembly 100 may define an upper portion of the movable contactor part 40.

The upper assembly 100 may surround the movable contactor assembly 200. A lower portion of the upper assembly 100 may be coupled to the lower assembly 300.

The coupling part 400 may be provided on an upper side of the upper assembly 100. Each component of the upper assembly 100 can be stably coupled by the coupling part 400.

The upper assembly 100 may include a housing 110 and an upper yoke 120.

The housing 110 may be coupled to the lower assembly 300 to accommodate the movable contactor assembly 200.

The housing 110 may have a rectangular parallelepiped shape with chambered edges.

Opposite sides of the housing 110, namely, left and right sides in the illustrated implementation may be open. In addition, a lower side of the housing 110 may be open. That is, the housing 110 may have a cross section in a rectangular shape with a lower side open. The movable contactor assembly 200 may be inserted into the open space.

The housing 110 may include a first surface 111, a second surface 112, a housing plane 113, a housing through hole 114, and a housing space 115.

The first surface 111 may define one side surface extending toward the lower assembly 300 among surfaces of the housing 110. In the illustrated implementation, the first surface 111 may define a front surface. The first surface 111 may face the second surface 112.

The first surface 111 may cover one side of the movable contactor 210 accommodated in the housing space 115. The first surface 111 may cover one side of a lower yoke 220 accommodated in the housing space 115.

A first bent portion 111*a* may be formed at one end portion of the first surface 111 facing the lower assembly 300, namely, a lower end portion of the first surface 111 in the illustrated implementation.

The first bent portion 111*a* may be a portion at which the first surface 111 is coupled to the lower assembly 300. In detail, the first bent portion 111*a* may be inserted into a bent portion 312*b* that forms a coupling slit 312 of a shaft support member 310.

The first bent portion 111*a* may extend at a predetermined angle with respect to the first surface 111. In the illustrated implementation, the first bent portion 111*a* may form a predetermined angle with the first surface 111 and extend outward, namely, toward the front in the illustrated implementation.

A plurality of first coupling holes 111*b* may be formed in a penetrating manner at one side of the first bent portion 111*a*, namely, at an upper side of the first bent portion 111*a* in the illustrated implementation. After the first surface 111 is inserted into the coupling slit 312, coupling members (not shown) may be coupled through the first coupling holes 111*b*. Accordingly, the coupled state between the upper assembly 100 and the lower assembly 300 can be firmly maintained.

The second surface 112 may define one surface extending toward the lower assembly 300 among surfaces of the housing 110. In the illustrated implementation, the second surface 112 may define a rear surface. The second surface 112 may face the first surface 111.

The second surface 112 may cover another side of the movable contactor 210 accommodated in the housing space 115 that is opposite to the one side of the movable contactor 210. The second surface 112 may cover another side of the lower yoke 220 accommodated in the housing space 115 that is opposite to the one side of the lower yoke 210.

A second bent portion 112*a* may be formed at one end portion of the second surface 112 facing the lower assembly 300, namely, a lower end portion of the second surface 111 in the illustrated implementation.

The second bent portion 112*a* may be a portion at which the second surface 112 is coupled to the lower assembly 300. In detail, the second bent portion 112*a* may be inserted into a bent portion 312*b* that forms the coupling slit 312 of the shaft support member 310.

The second bent portion 112*a* may extend at a predetermined angle with respect to the second surface 112. In the illustrated implementation, the second bent portion 112*a* may form a predetermined angle with the second surface 112 and extend outward, namely, toward the rear in the illustrated implementation.

A plurality of second coupling holes 112*b* may be formed in a penetrating manner at one side of the second bent portion 112*a*, namely, at an upper side of the second bent portion 112*a* in the illustrated implementation. After the second surface 112 is inserted into the coupling slit 312, coupling members (not shown) may be coupled through the second coupling holes 112*b*. Accordingly, the coupled state between the upper assembly 100 and the lower assembly 300 can be firmly maintained.

The first surface 111 and the second surface 112 may be formed overall in a rectangular shape. However, a width of the first surface 111 and the second surface 112 at portions adjacent to the housing plane 113 may be smaller than a width at portions adjacent to the lower assembly 300.

The first surface 111 and the second surface 112 may be spaced apart from each other by a predetermined distance. The spaced distance between the first surface 111 and the second surface 112 may be equal to or larger than widths (lengths in a back and forth direction in the illustrated implementation) of the movable contactor 210 and the lower yoke 220.

The housing plane 113 may define one surface of the housing 110, namely, an upper surface in the illustrated implementation. The housing plane 113 may cover an upper side of the movable contactor 210 accommodated in the housing space 115.

The first surface 111 and the second surface 112 may form predetermined angles with the housing plane 113 and extend toward the lower assembly 300, namely, downward in the illustrated implementation. In one implementation, the angles formed between the first and second surfaces 111 and 112 and the housing plane 113 may be a right angle.

A lower side of the upper yoke 120 may come in contact with an upper side of the housing plane 113. An upper side of the movable contactor 210 may come in contact with a lower side of the housing plane 113. That is, the housing plane 113 may be located between the upper yoke 120 and the movable contactor 210.

A pin member 410 and a support member 420 of the coupling part 400 may be inserted through the housing through hole 114.

The housing through hole 114 may be formed through the housing plane 113. In detail, the housing through hole 114 may formed through the housing plane 113 in the vertical direction.

In the illustrated implementation, the housing through hole 114 may be formed in a cylindrical shape with a central portion of the housing plane 113 as an axis. The shape of the housing through hole 114 may vary depending on a shape of the coupling part 400.

The housing through hole 114 may preferably be formed coaxially with an upper yoke through hole 124 that is formed through the upper yoke 120. In addition, the housing through hole 114 may have a larger diameter than the upper yoke through hole 124.

The movable contactor assembly 200 may be inserted into the housing space 115. The housing space 115 may be a space defined by the first surface 111, the second surface 112, the housing plane 113, and the shaft support member 310 of the lower assembly 300.

Specifically, the housing 110 may be formed so that both sides without the first surface 111 and the second surface 112, namely, left and right sides in the illustrated implementation are open.

The movable contactor assembly 200 may be accommodated in the housing space 115 through the left or right open portions. In one implementation, the movable contactor assembly 200 may be accommodated in the housing space 115 in a sliding manner.

The upper yoke 120 may cancel electromagnetic repulsive force that may be generated between the fixed contactor 22 and the movable contactor 210. The electromagnetic repulsive force may be mainly generated when the fixed contactor 22 and the movable contactor 210 are brought into contact with each other.

In detail, the upper yoke 120 may be magnetized when the fixed contactor 22 and the movable contactor 210 are electrically connected by being brought into contact with each other. In addition, as will be described later, the lower yoke 220 provided in the movable contactor assembly 200 may also be magnetized as the fixed contactor 22 and the movable contactor 210 are electrically connected by being brought into contact with each other.

Electromagnetic attractive force attractive force may be generated between the upper yoke 120 and the lower yoke 220. At this time, since the upper yoke 120 is fixedly coupled to the housing 110, the lower yoke 220 may have a tendency to move toward the upper yoke 120.

As will be described later, the lower yoke 220 may support the lower side of the movable contactor 210. Accordingly, as the lower yoke 220 receives electromagnetic attractive force attractive force in a direction toward the upper yoke 120, the movable contactor 210 may receive force in a direction toward the fixed contactor 22.

Therefore, even when the electromagnetic repulsive force is generated between the fixed contactor 22 and the movable contactor 210, the contact between the fixed contactor 22 and the movable contactor 210 can be stably maintained by the electromagnetic attractive force attractive force between the upper yoke 120 and the lower yoke 220.

The upper yoke 120 may have any shape capable of being magnetized by electromagnetic force generated by electric connection. In one implementation, the upper yoke 120 may be made of magnetizable iron, electromagnet, or the like.

In the illustrated implementation, the upper yoke 120 may be provided on an outer side of the housing 110. The upper yoke 120 may surround upper portions of the first surface 111 and the second surface 112 of the housing 110. Also, the upper yoke 120 may cover the housing plane 113 of the housing 110.

As will be described later, a movable contactor part 40 according to another implementation of the present disclosure may include an upper yoke 130 provided on an inner side of the housing 110. A detailed description thereof will be given later.

The upper yoke 120 may have a rectangular parallelepiped shape with chambered edges.

Opposite sides of the upper yoke 120, namely, left and right sides in the illustrated implementation may be open. In addition, a lower side of the upper yoke 120 may be open. That is, the upper yoke 120 may have a cross section in a rectangular shape with a lower side open. The housing 110 may be coupled to the open space.

The upper yoke 120 may include a first upper yoke surface 121, a second upper yoke surface 122, an upper yoke plane 123, and an upper yoke through hole 124.

The first upper yoke surface 121 may define one surface extending toward the lower assembly 300 or the housing 110 among surfaces of the upper yoke 120. In the illustrated implementation, the first upper yoke surface 121 may define a front surface. The first upper yoke surface 121 may face the second upper yoke surface 122.

The first upper yoke surface 121 may partially cover the first surface 111. Specifically, the first upper yoke surface 121 may cover a portion of the first surface 111 adjacent the housing plane 113.

The second upper yoke surface 122 may define one surface extending toward the lower assembly 300 or the housing 110 among surfaces of the upper yoke 120. In the illustrated implementation, the second upper yoke surface 122 may define a rear surface. The second upper yoke surface 122 may face the first is upper yoke surface 121.

The second upper yoke surface 122 may partially cover the second surface 112. Specifically, the second upper yoke surface 122 may cover a portion of the second surface 112 adjacent to the housing plane 113.

The first upper yoke surface 121 and the second upper yoke surface 122 may generally be formed in a rectangular shape and also be formed in a plate shape having a predetermined thickness.

The first upper yoke surface 121 and the second upper yoke surface 122 may be spaced apart from each other by a predetermined distance. The spaced distance between the first upper yoke surface 121 and the second upper yoke surface 122 may be equal to or larger than a length of the housing plane 113 (a length in the vertical direction in the illustrated implementation).

The upper yoke plane 123 may define one surface of the upper yoke 120, namely, an upper surface in the illustrated implementation. The upper yoke plane 123 may cover an upper side of the housing plane 113 of the housing 110. A lower side of the upper yoke plane 123 may come in contact with an upper side of the housing plane 113.

The first upper yoke surface 121 and the second upper yoke surface 122 may form predetermined angles with the upper yoke plane 123 and extend toward the lower assembly 300, namely, downward in the illustrated implementation. In one implementation, the angles formed between the first and second upper yoke surfaces 121 and 122 and the upper yoke plane 123 may be a right angle.

An upper side of the upper yoke plane 123 may be spaced apart from an inner surface of the arc chamber 21 by a predetermined distance. Even if the movable contactor part 40 is moved upward and the fixed contactor 22 and the movable contactor 210 come into contact with each other, the upper side of the upper yoke plane 123 and the inner surface of the arc chamber 21 may not come in contact with each other. This may result from the shape of the movable contactor 210 that extends back and forth, which will be described in detail later.

The pin member 410 and the support member 420 of the coupling part 400 may be inserted through the upper yoke through hole 124.

The upper yoke through hole 124 may be formed through the upper yoke plane 123. In detail, the upper yoke through hole 124 may be formed through the upper yoke plane 123 in the vertical (up and down) direction.

In the illustrated implementation, the upper yoke through hole 124 may be formed in a cylindrical shape with a central portion of the upper yoke plane 123 as an axis. The shape of the upper yoke through hole 124 may vary depending on the shape of the coupling part 400.

The upper yoke through hole 124 may preferably be formed coaxially with the housing through hole 114. In addition, the upper yoke through hole 124 may have a smaller diameter than the housing through hole 114.

With this configuration, the pin member 410 and the support member 420 that are coupled through the housing through hole 114 and the upper yoke through hole 124 can be stably maintained in the coupled state.

(2) Description of Movable Contactor Assembly 200

The movable contactor assembly 200 may include the movable contactor 210 that is brought into contact with or separated from the fixed contactor 22 as the shaft 320 of the lower assembly 300 is moved up and down. The movable contactor assembly 200 may be accommodated in the housing space 115 of the housing 110 to be movable up and down.

The upper assembly 100 may be located on an upper side of the movable contactor assembly 200. Specifically, the upper side of the movable contactor assembly 200 may come in contact with an inner surface of the housing 110.

The lower assembly 300 may be located on a lower side of the movable contactor assembly 200. Specifically, the movable contactor assembly 200 may be elastically supported by an elastic member 330 of the lower assembly 300.

The movable contactor assembly 200 may include the movable contactor 210 and the lower yoke 220.

The movable contactor 210 may come in contact with the fixed contactor 22 when control power is applied, so that the DC relay 1 can be electrically connected to an external power supply and a load. The movable contactor 210 may be separated from the fixed contactor 22 when control power is not applied, so that the DC relay 1 can be electrically disconnected from the external power supply and the load.

The upper side of the movable contactor 210 may come in contact with the housing 110. Specifically, the upper side of the movable contactor 210 may come in contact with an inner circumferential surface of the housing plane 113.

The lower side of the movable contactor 210 may come in contact with the lower yoke 220. In detail, the lower side of the movable contactor 210 may come in contact with an upper surface of the lower yoke 220.

The movable contactor 210 may extend in the longitudinal direction, namely, in left and right directions in the illustrated implementation. That is, a length of the movable contactor 210 may be longer than its width.

Accordingly, when the movable contactor 210 is accommodated in the housing space 115, both end portions of the movable contactor 210 in the is longitudinal direction may be exposed to the outside of the housing space 115. The both end portions may be brought into contact with the fixed contactor 22 when the movable contactor part 40 is moved upward.

With this configuration, even if the movable contactor part 40 is moved upward, the other parts except for the movable contactor 210 may not come into contact with the arc chamber 21 or the fixed contactor 22.

The width of the movable contactor 210 may be the same as a width of the housing space 115. In other words, the width of the movable contactor 210 may be the same as the predetermined distance by which the first surface 111 and the second surface 112 of the housing 110 are spaced apart from each other.

Accordingly, when the movable contactor 210 is accommodated in the housing space 115, both opposite surfaces of the movable contactor 210 in a widthwise direction may come in contact with inner surfaces of the first surface 111 and the second surface 112, respectively.

A thickness of the movable contactor 210 may be smaller than an extension length of the first upper yoke surface 121 and the second upper yoke surface 122 of the upper yoke 120. In other words, when viewed in cross section, the thickness of the movable contactor 210 may be set such that the movable contactor 210 can be completely covered by the first upper yoke surface 121 and the second upper yoke surface 122 (see FIG. 14).

With the configuration, the upper yoke 120 can effectively cancel electromagnetic repulsive force generated between the fixed contactor 22 and the movable contactor 210.

In one implementation, the movable contactor 210 may be moved up and down by a predetermined distance together with the lower yoke 220 within the housing space 115. The predetermined distance may be decided by the upper yoke 120, the lower yoke 220, and the elastic member 330.

The movable contactor 210 may include a body portion 211, protruding portions 212, a support member accommodating portion 213, a pin member coupling hole 214, and a coupling protrusion 215.

The body portion 211 may define a body of the movable contactor 210. As described above, the body portion 211 may extend in the longitudinal direction, namely, in the left and right directions in the illustrated implementation.

The protruding portions 212 may protrude from a central portion of the body portion 211 in directions forming a predetermined angle with the longitudinal direction, namely, in the back and forth directions in the illustrated implementation.

The protruding portions 212 may be portions where the movable contactor 210 accommodated in the housing space 115 comes in contact with the inner surfaces of the first surface 111 and the second surface 112. That is, the protruding portions 212 may be portions fitted to the housing 110 when the movable contactor 210 is accommodated in the housing space 115.

Protrusion lengths of the protruding portions 212 may preferably be determined according to the spaced distance between the first surface 111 and the second surface 112. Specifically, the sum of the protrusion lengths of the protruding portions 212 and a width of the body portion 211 may preferably be the same as the spaced distance between the first surface 111 and the second surface 112.

With the configuration, the movable contactor 210 can be stably fitted when the movable contactor 210 is accommodated in the housing space 115.

The support member 420 of the coupling part 400 may be inserted into is the support member accommodating portion 213. As described above, the support member 420 may be coupled through the housing through hole 114 and the upper yoke through hole 124.

When the coupling of the support member 420 is completed, a base portion 421 formed on a lower side of the support member 420 may protrude from the inner surface of the housing plane 113.

The support member accommodating portion 213 may be recessed by a predetermined distance into an upper surface of the body portion 211, and thus the base portion 421 of the coupled support member 420 may be inserted into the support member accommodating portion 213.

In the illustrated implementation, the support member accommodating portion 213 may be formed in a cylindrical shape having a circular cross section. The shape of the support member accommodating portion 213 may vary depending on a shape of the support member 420.

In the illustrated implementation, the support member accommodating portion 213 may be formed with a center of the body portion 211 as a central axis. The support member accommodating portion 213 may change in position, but may preferably be formed to have the same central axis as the housing through hole 114 and the upper yoke through hole 124.

A size of a cross section of the support member accommodating portion 213, that is, a diameter of the support member accommodating portion 213 may vary. That is, as will be described later, when the lower yoke 220 is coupled to the lower side of the movable contactor 210, the support member accommodating portion 213 and the pin member coupling hole 214 may be widened (expanded) by an arbitrary tool.

Accordingly, the diameter of the support member accommodating portion 213 may be increased, and thus the size of the cross section of the support member accommodating portion 213 may be increased.

The support member accommodating portion 213 may preferably be formed so that the increased size of the cross section is the same as a size of the base portion 421 of the support member 420.

The pin member 410 of the coupling part 400 may be inserted through the pin member coupling hole 214. The pin member coupling hole 214 may be formed through the body portion 211 in the longitudinal direction.

The pin member coupling hole 214 may be formed coaxially with the support member accommodating portion 213. Accordingly, the pin member 410 and the support member 420 can be coaxially coupled, so as to be stably maintained in the coupled state.

In the illustrated implementation, the pin member coupling hole 214 may be formed in a cylindrical shape having a circular cross section. The shape of the pin member coupling hole 214 may vary depending on a shape of the pin member 410.

A size of a cross section of the pin member coupling hole 214, that is, a diameter of the pin member coupling hole 214 may vary. That is, as will be described later, when the lower yoke 220 is coupled to the lower side of the movable contactor 210, the pin member coupling hole 214 as well as the support member accommodating portion 213 may be widened by an arbitrary tool.

Accordingly, the diameter of the pin member coupling hole 214 may be increased, and thus the size of the cross section of the pin member coupling hole 214 may be increased.

The pin member coupling hole 214 may preferably be formed so that the increased size of the cross section is larger than the diameter of the pin member 410. This may result in preventing an electrical connection due to the contact between the pin member 410 and the movable contactor 210.

This may also allow the movable contactor 210 and the lower yoke 220 to be moved up and down by a predetermined distance, so as to prevent damage due to fixed coupling.

The coupling protrusion 215 may be a portion at which the lower yoke 220 is coupled to the movable contactor 210. The coupling protrusion 215 may protrude by a predetermined distance from the lower surface of the movable contactor 210.

A protrusion distance of the coupling protrusion 215 may be larger than a height of a yoke inner circumferential surface 222 of the lower yoke 220. That is, a lower end portion of the coupling protrusion 215 may be located to be lower than the yoke inner circumferential surface 222.

The coupling protrusion 215 may be formed coaxially with the central portion of the body portion 211. That is, a central axis of the coupling protrusion 215 may be disposed coaxially with a central axis of the body portion 211. Accordingly, the coupling protrusion 215 may also be disposed coaxially with the housing through hole 114, the upper yoke through hole 124, the support member accommodating portion 213, and the pin member coupling hole 214.

A hollow portion may be formed through the inside of the coupling protrusion 215 in a height direction. The hollow portion may communicate with the support member accommodating portion 213. That is, it can be said that the hollow portion constitutes a part of the support member accommodating portion 213.

The pin member 410 may be coupled through the movable contactor 210 such that one end portion thereof protrudes below the movable contactor 210 through the hollow portion.

The coupling protrusion 215 may have a circular cross section. That is, the coupling protrusion 215 may protrude from a lower surface of the body portion 211 toward the lower assembly 300, namely, downward in the illustrated implementation.

The coupling protrusion 215 may include a coupling outer circumferential surface 215*a*. The coupling outer circumferential surface 215*a* may define an outer surface of the coupling protrusion 215. In the illustrated implementation, the coupling protrusion 215 may have a cylindrical shape, and the coupling outer circumferential surface 215*a* may be defined as a side surface of the coupling protrusion 215.

The yoke inner circumferential surface 222 of the lower yoke 220 may come in contact with the coupling outer circumferential surface 215*a*.

When the upper surface of the lower yoke 220 comes in contact with the lower surface of the movable contactor 210, the coupling outer circumferential surface 215*a* and the yoke inner circumferential surface 222 may be spaced apart by a predetermined distance. At this time, as described above, the support member accommodating portion 213 and the pin member coupling hole 214 of the movable contactor 210 may be expanded by an arbitrary tool.

By the expansion, the coupling outer circumferential surface 215*a* may be moved toward the yoke inner circumferential surface 222. As the expansion proceeds, the coupling outer circumferential surface 215*a* may come in contact with the yoke inner circumferential surface 222. Accordingly, the movable contactor 210 and the lower yoke 220 can be fitted to each other without a separate member.

The lower yoke 220 may cancel electromagnetic repulsive force that may be generated between the fixed contactor 22 and the movable contactor 210. The electromagnetic repulsive force may be mainly generated when the fixed contactor 22 and the movable contactor 210 are brought into contact with each other.

In detail, the lower yoke 220 may be magnetized when the fixed contactor 22 and the movable contactor 210 are electrically connected by being brought into contact each other. As described above, the electrical connection between the fixed contactor 22 and the movable contactor 210 may also magnetize the upper yoke 120.

Electromagnetic attractive force attractive force may thusly be generated between the lower yoke 220 and the upper yoke 120. At this time, since the upper yoke 120 is fixedly coupled to the housing 110, the lower yoke 220 may have a tendency to move toward the upper yoke 120.

As this time, the lower yoke 220 may support the lower side of the movable contactor 210. Specifically, the upper surface of the lower yoke 220 may be brought into contact the lower surface of the movable contactor 210. Accordingly, when the lower yoke 220 receives the electromagnetic attractive force attractive force in a direction toward the upper yoke 120, the lower yoke 220 may apply force to the movable contactor 210 to be moved toward the upper yoke 120.

Therefore, even when the electromagnetic repulsive force is generated due to the contact between the fixed contactor 22 and the movable contactor 210, is the contact between the fixed contactor 22 and the movable contactor 210 can be stably maintained by the electromagnetic attractive force attractive force between the upper yoke 120 and the lower yoke 220.

The lower yoke 220 may have any shape capable of being magnetized by electromagnetic force generated by electric connection. In one implementation, the lower yoke 220 may be made of magnetizable iron, electromagnet, or the like.

The lower yoke 220 may have a rectangular parallelepiped shape in the longitudinal direction, namely, in the left and right directions in the illustrated implementation. That is, a length of the lower yoke 220 may be longer than its width.

Accordingly, when the lower yoke 220 is accommodated in the housing space 115, both end portions of the lower yoke 220 in the longitudinal direction may be exposed to the outside of the housing space 115. The both end portions may generate electromagnetic attractive force attractive force with the upper yoke 120.

With this configuration, even when the electromagnetic repulsive force is generated between the fixed contactor 22 and the movable contactor 210, the lower yoke 220 can cover most of the movable contactor 210 in the longitudinal direction. Accordingly, the contact state between the fixed contactor 22 and the movable contactor 210 can be stably maintained.

An extension length of the lower yoke 220 may be shorter than an extension length of the movable contactor 210.

The lower yoke 212 may be provided with protruding portions protruding in directions forming a predetermined angle with the longitudinal direction, namely, in the back and forth directions in the illustrated implementation. A width of the lower yoke 220 provided with the protruding portions may be the same as a width of the housing space 115.

In other words, the width of the lower yoke 220 provided with the protruding portions may be the same as the predetermined distance by which the first surface 111 and the second surface 112 of the housing 110 are spaced apart from each other.

Accordingly, when the lower yoke 220 is accommodated in the housing space 115, both opposite surfaces of the lower yoke 220 in a widthwise direction may come in contact with the inner surfaces of the first surface 111 and the second surface 112, respectively. With the configuration, the lower yoke 220 can be stably accommodated in the housing space 115.

In one implementation, the lower yoke 220 may be moved up and down by a predetermined distance together with the movable contactor 210 within the housing space 115. The predetermined distance may be decided by the upper yoke 120, the lower yoke 220, and the elastic member 330.

A lower side of the lower yoke 220 may come in contact with an upper side of the elastic member 330. That is, the elastic member 330 may not directly come in contact with the movable contactor 210. Accordingly, even if the elastic member 330 is compressed and stretched repeatedly, the movable contactor 210 may not be damaged.

The lower yoke 220 may include a movable contactor coupling portion 221, a yoke inner circumferential surface 222, an elastic member support portion 223, and a main inner surface 224.

The movable contactor coupling portion 221 may be a portion at which the lower yoke 220 is coupled to the movable contactor 210. In addition, the pin member 410 may be coupled through the movable contactor coupling portion 221.

The movable contactor coupling portion 221 may be recessed by a predetermined distance into one surface of the lower yoke 220 facing the movable contactor 210, namely, an upper surface of the lower yoke 220 in the illustrated implementation.

The movable contactor coupling portion 221 may communicate with the pin member coupling hole 214 of the movable contactor 210. The pin member 410 coupled through the pin member coupling hole 214 may be inserted through the movable contactor coupling portion 221. A diameter of the movable contactor coupling portion 221 may be larger than a diameter of the pin member coupling hole 214.

One end portion of the pin member 410 coupled through the movable contactor coupling portion 221, namely, a lower end portion of the pin member 410 in the illustrated implementation may be located to be lower than a lower surface of the lower yoke 220.

The movable contactor coupling portion 221 may have the same central axis as the pin member coupling hole 214. Accordingly, the movable contactor coupling portion 221 may also be disposed coaxially with the housing through hole 114, the upper yoke through hole 124, the support member accommodating portion 213, and the pin member coupling hole 214.

The diameter of the movable contactor coupling portion 221 may preferably be determined according to an expanded diameter of the coupling protrusion 215 of the movable contactor 210.

That is, as described above, the diameter of the coupling protrusion 215 may be increased as the support member accommodating portion 213 and the pin member coupling hole 214 are expanded. In this case, the diameter of the movable contactor coupling portion 221 may be equal to or smaller than the diameter of the coupling protrusion 215.

With this configuration, the lower yoke 220 can be coupled to the movable contactor 210 without a separate member. A detailed description thereof will be described later.

The yoke inner circumferential surface 222 may be a portion brought into contact with the coupling outer circumferential surface 215*a*. The yoke inner circumferential surface 222 may be defined as an upper inner circumferential surface of the lower yoke 220.

As described above, before the support member accommodating portion 213 and the pin member coupling hole 214 are expanded, the diameter of the coupling protrusion 215 may be smaller than the diameter of the movable contactor coupling portion 221. Accordingly, the yoke inner circumferential surface 222 and the coupling outer circumferential surface 215*a* may be spaced apart from each other by a predetermined distance.

When the support member accommodating portion 213 and the pin member coupling hole 214 are expanded, the diameter of the coupling protrusion 215 may be increased. Accordingly, the coupling outer circumferential surface 215*a* can be moved toward the yoke inner circumferential surface 222 to be in contact with the yoke inner circumferential surface 222.

This may allow the lower yoke 220 to be coupled to the movable contactor 210 without a separate member.

The elastic member support portion 223 may be a space in which an upper side of the elastic member 330 of the lower assembly 300 is accommodated. The elastic member support portion 223 may be recessed by a predetermined distance into the lower surface of the lower yoke 220.

The elastic member support portion 223 may communicate with the movable contactor coupling portion 221. In addition, the elastic member support portion 223 may communicate with the support member accommodating portion 213 of the movable contactor 210 and the pin member coupling hole 214.

Accordingly, the pin member 410 inserted through the movable contactor 210 can pass through the lower yoke 220.

The elastic member support portion 223 may be formed in a cylindrical shape having a predetermined diameter. In the illustrated implementation, the elastic member support portion 223 may have a diameter larger than the movable contactor coupling portion 221.

When the expansion of the support member accommodating portion 213 and the pin member coupling hole 214 is completed, the coupling outer circumferential surface 215*a* and the yoke inner circumferential surface 222 may come in contact with each other. At this time, the protrusion length of the coupling protrusion 215 may be larger than a height of the yoke inner circumferential surface 222.

Accordingly, a part of the lower side of the coupling outer circumferential surface 215*a* may protrude toward the elastic member support portion 223 without coming in contact with the yoke inner circumferential surface 222. In this case, the part of the lower side of the coupling outer circumferential surface 215*a* and the main inner surface 224 of the lower yoke 220 defining the elastic member support portion 223 may be spaced apart from each other by a predetermined distance.

As will be described later, the elastic member 330 may be provided with an elastic hollow portion 331 defined therein. When the elastic member 330 is accommodated in the elastic member support portion 223, the part of the lower side of the coupling protrusion 215 may be inserted into the elastic hollow portion 331. In addition, a body of the elastic member 330 may be accommodated in the elastic member support portion 223 that is formed at a radially outside of the coupling protrusion 215.

Accordingly, the elastic member 330 can be stably accommodated in the elastic member support portion 223.

The main inner surface 224 may be an inner surface defining the elastic member support portion 223. The main inner surface 224 may be defined as a lower inner circumferential surface of the inner circumferential surface of the lower yoke 220. The outer circumferential surface of the elastic member 330 may come in contact with the main inner surface 224.

(3) Description of Lower Assembly 300

The lower assembly 300 may define the lower side of the movable contactor part 40. In addition, the lower assembly 300 may be connected to the core part 30 to transmit driving force generated by the movable core 32 or the return spring 36 to the movable contactor part 40. The driving force transmitted by the lower assembly 300 may allow the movable contactor part 40 to be moved upward or downward. Accordingly, the fixed contactor 22 and the movable contactor 210 can be brought into contact with or separated from each other.

The lower assembly 300 may be coupled to the upper assembly 100 with a predetermined space formed therebetween. The predetermined space may be defined as the housing space 115. The movable contactor assembly 200 may be accommodated in the housing space 115.

The upper assembly 100 and the movable contactor assembly 200 are located above the lower assembly 300. The core part 30 may be located below the lower assembly 300. Movement of the core part 30, that is, movement of the movable core 32 or movement by restoration of the return spring 36 may be transmitted to the lower assembly 300.

The lower assembly 300 may include the shaft support member 310, the shaft 320, and the elastic member 330.

The shaft support member 310 may define a body of the lower assembly 300. The housing 110 of the upper assembly 100 may be coupled to the shaft support member 310.

In addition, the shaft support member 310 may support a lower side of the elastic member 330. Furthermore, the shaft 320 may be coupled to the shaft support member 310 so that the lower assembly 300 can be moved by the movable core 32 and the return spring 36.

The shaft support member 310 may be coupled to the housing 110 with a predetermined space defined therebetween.

The shaft support member 310 may have a rectangular parallelepiped shape extending in the longitudinal direction, namely, in the back and forth direction in the illustrated implementation.

The shaft support member 310 may include housing coupling portions 311, coupling slits 312, an elastic member accommodating portion 313, an elastic member coupling portion 314, and a shaft coupling portion 315.

The housing coupling portions 311 may be portions at which the housing 110 is coupled to the shaft support member 310. Specifically, the lower end is portion of the first surface 111 and the lower end portion of the second surface 112 may be coupled to the housing coupling portions 311.

The housing coupling portions 311 may protrude from both end portions of the shaft support member 310 in the longitudinal direction, namely, from front and rear end portions in the illustrated implementation. The housing coupling portions 311 may protrude toward the housing 110, namely, upward in the illustrated implementation.

Accordingly, a space between the housing coupling portions 311 located at the front side and the rear side may have a shape which is recessed compared to the housing coupling portions 311. The space may be defined as the elastic member accommodating portion 313.

A spaced distance between the housing coupling portions 311 may be longer than a length of the housing space 115 in the back and forth direction. That is, a spaced distance between outer surfaces of the housing coupling portions 311 may be longer than the spaced distance between the first surface 111 and the second surface 112.

As the housing coupling portions 311 protrude, a sufficient depth can be secured for coupling the lower end portion of the first surface 111 and the lower end portion of the second surface 112.

The lower end portion of the first surface 111 and the lower end portion of the second surface 112 may be coupled to the coupling slits 312, respectively. The coupling slits 312 may be respectively recessed into the housing coupling portions 311 by predetermined distances.

A distance by which the coupling slits 312 are spaced apart from each other may be equal to a length of the housing space 115 in the back and forth direction. That is, the spaced distance between the coupling slits 312 may be the same as the spaced distance between the first surface 111 and the second surface 112.

The shape of the coupling slits 312 may be determined to correspond to the shape of the first surface 111 and the second surface 112.

Each of the coupling slits 312 may include a vertical portion 312*a* and a bent portion 312*b*. The vertical portion 312*a* may be recessed into one surface of the housing coupling portion 311, namely, an upper surface in the illustrated implementation, by a predetermined distance.

The vertical portion 312*a* may be vertically recessed with respect to the upper surface of the housing coupling portion 311. The vertical portion 312*a* may communicate with the bent portion 312*b*.

The bent portion 312*b* may be recessed by a predetermined distance at a predetermined angle with respect to the vertical portion 312*a*. The predetermined angle formed between the bent portion 312*b* and the vertical portion 312*a* may be the same as a predetermined angle formed between the first surface 111 and the first bent portion 111*a*. The predetermined angle formed between the bent portion 312*b* and the vertical portion 312*a* may be the same as a predetermined angle formed between the second surface 112 and the second bent portion 112*a*.

The bent portion 312*b* may communicate with the vertical portion 312*a*. Accordingly, the first surface 111 and the second surface 112 may be inserted into the bent portions 312*b* via the vertical portions 312*a*, respectively.

As the bent portions 312*b* are formed, the coupled state between the housing 110 and the shaft support member 310 can be stably maintained compared to the case where only the vertical portions 312*a* are formed.

The elastic member accommodating portion 313 may be a space in which the elastic member 330 is accommodated. The elastic member accommodating portion 313 may be defined between the housing coupling portions 311.

An upper boundary of the elastic member accommodating portion 313 may be defined by the movable contactor 210 and the lower yoke 220. In addition, a boundary of the elastic member accommodating portion 313 in the back and forth direction may be defined by the first surface 111 and the second surface 112.

That is, the elastic member accommodating portion 313 may be defined as a space surrounded by the housing 110, the movable contactor 210, the lower yoke 220, and the shaft support member 310.

The elastic member coupling portion 314 may support the lower side of the elastic member 330 accommodated in the elastic member accommodating portion 313. Specifically, the elastic member coupling portion 314 may be inserted into the elastic hollow portion 331 of the elastic member 330. This may prevent the elastic member 330 from being arbitrarily separated from the elastic member accommodating portion 313.

The elastic member coupling portion 314 may protrude upward from one surface of the shaft support member 310, namely, from an upper surface of the shaft support member 310 in the illustrated implementation. In the illustrated implementation, the elastic member coupling portion 314 may have a cylindrical shape with a circular cross section. A diameter of the elastic member coupling portion 314 may preferably be equal to or smaller than a diameter of the elastic hollow portion 331.

The shaft coupling portion 315 may be a space into which a head portion 321 and a part of the shaft body portion 322 of the shaft 320 are coupled. The shaft coupling portion 315 may be formed inside the shaft support member 310.

In one implementation, the shaft coupling portion 315 and the shaft 320 may be integrally formed with each other. In the implementation, the shaft coupling portion 315 and the shaft 320 may be formed by insert injection molding.

The shaft 320 coupled to the shaft coupling portion 315 may be moved integrally with the shaft support member 310. Accordingly, when the shaft 320 is moved upward or downward, the shaft support member 310 may also be moved upward or downward.

The shaft 320 may transmit driving force, which is generated in response to the operation of the core part 30, to the movable contactor part 40. The shaft 320 may extend in the longitudinal direction, namely, in the up and down (vertical) direction in the illustrated implementation.

The shaft 320 may be coupled to the shaft support member 310. Specifically, an upper side of the shaft 320 may be coupled to the shaft coupling portion 315.

The shaft 320 may be coupled to the core part 30. Specifically, a lower side of the shaft 320 may be brought into contact with the protrusions 32*a* of the movable core 32, so that the shaft 320 can be moved together with the movable core 32.

The shaft 320 may be coupled to the fixed core 31 to be movable up and down. In addition, the return spring 36 may be coupled through the shaft 320.

The shaft 320 may include a head portion 321, a shaft body portion 322, and a movable core support portion 323.

The head portion 321 may define an upper side of the shaft 320. The head portion 321 may be formed in a circular plate shape. A diameter of the head portion 321 may be larger than a diameter of the shaft body portion 322.

The head portion 321 may be inserted into the shaft coupling portion 315. Due to the shape of the head portion 321, the shaft 320 may not be arbitrarily separated from the shaft coupling portion 315.

The shaft body portion 322 may extend downward from the head portion 321. The shaft body portion 322 may define the body of the shaft 320. The shaft body portion 322 may extend in the longitudinal direction.

The shaft body portion 322 may be coupled through the fixed core 31 to be movable up and down. The shaft 320 may extend in the longitudinal direction.

The movable core support portion 323 may be provided on a lower end portion of the shaft body portion 322. The movable core support portion 323 may have a diameter smaller than the shaft body portion 322. The movable core support portion 323 may be inserted into a space defined as the protrusions 32*a* of the movable core 32 are spaced apart from each other.

That is, one end portion of the shaft body portion 322 adjacent to the movable core support portion 323 may be supported by the protrusions 32*a* of the movable core 32. Accordingly, when the movable core 32 is moved upward, the shaft 320 pushed by the protrusions 32*a* may be moved upward together with the movable core 32.

The return spring 36 may be coupled through the shaft body portion 322. A lower end portion of the return spring 36 may be supported by the protrusions 32*a* of the movable core 32. Accordingly, when the movable core 32 is moved upward, the return spring 36 may be compressed and store restoring force.

When control power is not applied, the movable core 32 may not receive electromagnetic attractive force from the fixed core 31. At this time, the movable core 32 may be moved downward by the restoring force stored in the return spring 36. Accordingly, the shaft 320 may also be moved downward together with the movable core 32.

The elastic member 330 may prevent the fixed contactor 22 and the movable contactor 210 from being arbitrarily separated from each other by electrostatic repulsive force. To this end, the elastic member 330 may elastically support the movable contactor assembly 200 at the lower side of the lower yoke 220.

The elastic member 330 may be accommodated in the elastic member accommodating portion 313. The lower side of the elastic member 330 accommodated in the elastic member accommodating portion 313 may be supported by the upper surface of the shaft support member 310. In addition, the upper side of the elastic member 330 may come in contact with the elastic member support portion 223 so as to elastically support the lower yoke 220 and the movable contactor 210.

The elastic member 330 may be formed in any shape capable of being compressed or stretched to store restoring force and transmitting the stored restoring force to the outside. In one implementation, the elastic member 330 may be configured as a coil spring.

The elastic member 330 may include an elastic hollow portion 331. The elastic hollow portion 331 may be a space formed through the inside of the elastic member 330.

The coupling protrusion 215 may be inserted into an upper side of the elastic hollow portion 331. In addition, the elastic member coupling portion 314 may be inserted into a lower side of the elastic hollow portion 331. Accordingly, the elastic member 330 can be stably accommodated in the elastic member accommodating portion 313 without being arbitrarily separated from the elastic member accommodating portion 313.

(4) Description of Coupling Part 400

The coupling part 400 may be configured to firmly couple each component of the upper assembly 100. In addition, the coupling part 400 may prevent the movable contactor 210 from being arbitrarily separated from the movable contactor part 40.

The coupling part 400 may be fitted to the movable contactor part 40. That is, the coupling part 400 may be coupled to the movable contactor part 40 by its own shape deformation without a separate coupling member.

The coupling part 400 may include a pin member 410 and a support member 420.

The pin member 410 may prevent the movable contactor 210 from being arbitrarily separated from the movable contactor part 40. To this end, the pin member 410 may be coupled sequentially through the upper yoke 120, the housing 110, the movable contactor 210, and the lower yoke 220.

Specifically, the pin member 410 may be inserted sequentially through the upper yoke through hole 124, the housing through hole 114, the pin member coupling hole 214, and the movable contactor coupling portion 221. The pin member 410 may be inserted until its one end portion, namely, a lower end portion in the illustrated implementation, is accommodated in the elastic hollow portion 331.

Accordingly, the pin member 410 can prevent the movable contactor 210 is from being arbitrarily separated from the housing space 115.

The support member 420 may be provided on a radially outside of the pin member 410. The pin member 410 may be fitted to the support member 420.

That is, the support member 420 may be inserted through the upper yoke 120, the housing 110, and the movable contactor 210. The pin member 410 may be coupled through a first hollow portion 423 and a second hollow portion 424 formed in the support member 420. That is, coupling of the pin member 410 with the upper yoke 120 and the housing 110 may be achieved by the support member 420.

The pin member 410 may extend in the longitudinal direction. In the illustrated implementation, the pin member 410 may be formed in a cylindrical shape having a circular cross section, but the shape may vary.

As will be described later, the pin member 410 may be deformed by pressure. In addition, when the application of the pressure is released, the pin member 410 may be restored in a radially outward direction (see FIGS. 13 and 14).

To this end, the pin member 410 may be formed of a material having a predetermined elasticity. In one implementation, the pin member 410 may be formed of iron or stainless steel.

In a state where radially inward pressure is not applied, a diameter of the pin member 410 may preferably be larger than a diameter of the second hollow portion 424 of the support member 420.

Also, in a state where radially inward pressure is applied, the diameter of the pin member 410 may preferably be equal to or smaller than the diameter of the second hollow portion 424 of the support member 420.

The pin member 410 may include a cutout portion 411, a hollow portion 412, and an outer circumferential portion 413.

The cutout portion 411 may be a space in which the outer circumferential portion 413 of the pin member 410 can be compressed radially inward when the pin member 410 receives radially inward pressure. The cutout portion 411 may be open along the longitudinal direction of the pin member 410.

As the name implies, the cutout portion 411 may be formed by removing a part of the outer circumferential portion 413 of the pin member 410. In one implementation, the cutout portion 411 may be formed by cutting out of the part of the outer circumferential portion 413.

The cutout portion 411 may be defined by a first end portion 411*a* and a second end portion 411*b*. The first end portion 411*a* may be one end portion of the outer circumferential portion 413 in a circumferential direction. The second end portion 411*b* may be another end portion of the outer circumferential portion 413 in the circumferential direction.

The first end portion 411*a* and the second end portion 411*b* may face each other. In addition, the first end portion 411*a* and the second end portion 411*b* may be spaced apart from each other by a predetermined distance. The cutout portion 411 may be a space which is defined as the first end portion 411*a* and the second end portion 411*b* are spaced apart from each other.

When radially inward pressure is applied to the pin member 410, the outer circumferential portion 413 may be compressed radially inward and deformed. At this time, a displacement occurred due to the compression of the outer circumferential portion 413 may be compensated for by the cutout portion 411.

In addition, a length of the cutout portion 411 in the circumferential direction, that is, the spaced distance between the first end portion 411*a* and the second end portion 411*b* may be determined according to the diameter of the second hollow portion 424 of the support member 420.

That is, when the pin member 410 is compressed, the first end portion 411*a* and the second end portion 411*b* may be moved to be adjacent to each other, and the diameter of the pin member 410 may be reduced accordingly. In this instance, a maximum distance that the pin member 410 can be compressed may be determined to be the spaced distance between the first end portion 411*a* and the second end portion 411*b*, that is, a circumferential length of the cutout portion 411.

Therefore, the circumferential length of the cutout portion 411 may preferably be determined such that the diameter of the pin member 410 whose shape is deformed by receiving the radially inward pressure is equal to or smaller than the diameter of the second hollow portion 424.

At the same time, the circumferential length of the cutout portion 411 may preferably be determined such that the diameter of the pin member 410 in the state in which the radially inward pressure is not applied is larger than the diameter of the second hollow portion 424.

Accordingly, the pin member 410 can be coupled through the second hollow portion 424 by being changed in shape due to reception of the radially inward pressure. When the radially inward pressure is released after the coupling of the pin member 410 is completed, the pin member 410 may be deformed radially outward. Accordingly, the pin member 410 and the support member 420 can be firmly press-fitted to each other.

The hollow portion 412 may be a space defined inside the pin member 410. The hollow portion 412 may be formed through the pin member 410 in the longitudinal direction of the pin member 410. As the hollow portion 412 is formed, rigidity of the pin member 410 in the longitudinal direction can be increased.

In addition, as the hollow portion 412 is formed, the outer circumferential portion 413 can be changed in shape when the radially inward pressure is applied to the pin member 410.

The outer circumferential portion 413 may define an outer circumference, namely, an outer boundary of the pin member 410. In the illustrated implementation, since the pin member 410 has a cylindrical shape, the outer circumferential portion 413 may be defined as a side surface of the pin member 410.

The outer circumferential portion 413 may be formed discontinuously. That is, a part of the outer circumferential portion 413 may be removed. The removed portion may be defined as the cutout portion 411. The cutout portion 411 may be defined as a space between the first end portion 413*a* and the second s end portion 413*b* of the outer circumferential portion 413.

An outer surface of the outer circumferential portion 413 may be defined as an outer circumferential surface 413*a*.

The outer circumferential surface 413*a* may define an outer surface of the pin member 410. When the pin member 410 is coupled to the support member 420, the outer circumferential surface 413*a* may come in contact with a pin member contact surface 425 defining the second hollow portion 424.

At this time, as described above, the pin member 410 may be coupled to the support member 420 in the state in which the diameter of the pin member 410 is reduced by receiving the radially inward pressure. Accordingly, the outer circumferential surface 413*a* can be brought into contact with the pin member contact surface 425 while applying radially outward pressure.

Accordingly, the pin member 410 and the support member 420 can be press-fitted to each other, so as to be stably maintained in the coupled state.

The support member 420 may allow stable coupling between the housing 110 and the upper yoke 120. In addition, the pin member 410 may be coupled through the support member 420. Since the support member 420 and the pin member 410 are press-fitted to each other, the pin member 410 coupled through the support member 420 cannot be arbitrarily separated.

The support member 420 may be located on an upper side of the upper assembly 100. Specifically, the support member 420 may be coupled through the housing 110 and the upper yoke 120. In addition, the support member 420 may be inserted into the movable contactor 210.

At this time, the support member 420 may be deformed to be press-fitted to the housing 110, the upper yoke 120, and the movable contactor 210.

In the illustrated implementation, the support member 420 may have a circular cross section and extend in the vertical direction. The shape of the support member 420 may vary to correspond to the shapes of the housing through hole 114, the upper yoke through hole 124, and the support member accommodating portion 213 to which the support member 420 is coupled.

The support member 420 may include a base portion 421, a boss portion 422, a first hollow portion 423, a second hollow portion 424, and a pin member contact surface 425.

The base portion 421 may define one side of the support member 420, namely, a lower side of the support member 420 in the illustrated implementation. The base portion 421 may be formed in a disk shape having a predetermined thickness. The shape of the base portion 421 may change to correspond to the shape of the support member accommodating portion 213.

The base portion 421 may be inserted into the support member accommodating portion 213. One surface of the base portion 421 facing the movable contactor 210, namely, a lower surface in the illustrated implementation, may come in contact with the movable contactor 210.

Another surface of the base portion 421 opposite to the one surface, namely, an upper surface in the illustrated implementation, may come in contact with the housing plane 113 of the housing 110. That is, the base portion 421 may be located between the housing plane 113 and the movable contactor 210.

The boss portion 422 may protrude by a predetermined distance from the one surface of the base portion 421 opposite to the movable contactor 210, namely, from the upper surface in the illustrated implementation.

The boss portion 422 may be a portion of the support member 420 that is coupled through the housing 110 and the upper yoke 120. Specifically, the boss portion 422 may be coupled through the housing through hole 114 and the upper yoke through hole 124.

A protrusion distance of the boss portion 422 may preferably be determined to be larger than a sum of thicknesses of the housing plane 113 and the upper yoke plane 123. That is, a part of the boss portion 422 may protrude to the outside of the upper yoke plane 123.

The boss portion 422 may have a cylindrical shape extending in the vertical direction. The shape of the boss portion 422 may change to correspond to the shapes of the housing through hole 114 and the upper yoke through hole 124.

The first hollow portion 423 and the second hollow portion 424 may be defined through the boss portion 422 in a height direction of the boss portion 422. The first hollow portion 423 may be defined by a boss portion inner circumferential surface 422*a* forming an inner circumferential surface of the boss portion 422.

The first hollow portion 423 may be a space defined inside the boss portion 422. The first hollow portion 423 may be defined by the boss portion inner circumferential surface 422*a*. That is, the first hollow portion 423 may be a space surrounded by the boss portion inner circumferential surface 422*a*.

A pin member 410 may be coupled through the first hollow portion 423. The first hollow portion 423 may communicate with the second hollow portion 424. The first hollow portion 423 may be a space defined above the second hollow portion 424.

The first hollow portion 423 may have a larger diameter than the second hollow portion 424. This may allow smooth insertion of an arbitrary tool for expanding the first hollow portion 423 and the second hollow portion 424 radially outward, as will be described later.

The second hollow portion 424 may be a space located below the first hollow portion 423. The second hollow portion 424 may communicate with the first hollow portion 423.

The second hollow portion 424 may be a space defined inside the base portion 421 and the boss portion 422. The second hollow portion 424 may be defined by the pin member contact surface 425. That is, the second hollow portion 424 may be a space surrounded by the pin member contact surface 425.

The pin member 410 may be coupled through the second hollow portion 424. When the pin member 410 is coupled through the second hollow portion 424, the outer circumferential surface 413*a* of the pin member 410 may be brought into contact with the pin member contact surface 425. As described above, the outer circumferential surface 413*a* may be brought into contact with the pin member contact surface 425 while applying radially outward pressure to the pin member contact surface 425.

An arbitrary tool may be inserted into the first hollow portion 423. In one implementation, the arbitrary tool may be configured as a circular ring punch.

After the arbitrary tool is inserted into the first hollow portion 423, it may further be inserted into the second hollow portion 424. The arbitrary tool may apply radially outward pressure to the first hollow portion 423 and the second hollow portion 424.

Accordingly, the first hollow portion 423 and the second hollow portion 424 may be expanded radially outward. At the same time, outer circumferences of the base portion 421 and the boss portion 422 may also be expanded radially outward.

At this time, the base portion 421 may be expanded until the upper surface of the base portion 421 is brought into contact with the lower surface of the housing plane 113. At the same time, the boss portion 422 may be expanded until the outer circumferential surface of the boss portion 422 is brought into contact with the inner circumferential surface of the upper yoke plane 123 defining the upper yoke through hole 124.

Accordingly, the housing 110, the upper yoke 120, and the support member 420 can be stably coupled by shape deformation of the support member 420 without a separate coupling member.

The pin member contact surface 425 may be defined as an inner circumferential surface of the support member 420 surrounding the second hollow portion 424. The pin member contact surface 425 may have a height higher than the base portion 421.

The pin member contact surface 425 may be located radially inward with respect to the boss portion inner circumferential surface 422*a*. That is, the second hollow portion 424 defined by the pin member contact surface 425 may have a smaller diameter than the first hollow portion 423 defined by the boss portion inner circumferential surface 422*a*.

4. Description of Method for Manufacturing Movable Contactor Part 40 According to Implementation The movable contactor part 40 according to the implementation of the present disclosure may include the upper assembly 100, the movable contactor assembly 200, the lower assembly 300, and the coupling part 400. In this instance, the upper assembly 100, the movable contactor assembly 200, the lower assembly 300, and the coupling part 400 may be stably coupled together by shape deformation of provided components without a separate member for coupling.

Hereinafter, a detailed description will be given of a method for manufacturing the movable contactor part 40 according to an implementation of the present disclosure, with reference to FIGS. 7 to 22.

(1) Description of Manufacturing Method (S100) of Upper Assembly 100

A method for manufacturing the upper assembly 100 will be described with reference to FIGS. 7, 8, 18, and 19.

First, the housing 110 and the upper yoke 120 may be coupled to each other (S110). Specifically, the housing 110 may be inserted into the space defined by the first upper yoke surface 121, the second upper yoke surface 122, and the upper yoke plane 123 of the upper yoke 120.

At this time, the first upper yoke surface 121 and the second upper yoke surface 122 may cover the upper sides of the first surface 111 and the second surface 112 of the housing 110, respectively. Inner surfaces of the first upper yoke surface 121 and the second upper yoke surface 122 may be brought into contact with outer surfaces of the first surface 111 and the second surface 112, respectively.

Also, the upper yoke plane 123 may cover the housing plane 113. To this end, the upper yoke plane 123 may extend longer than the housing plane 113.

The housing through hole 114 may be formed through the housing plane 113. In addition, the upper yoke through hole 124 may be formed through the upper yoke plane 123. The housing through hole 114 and the upper yoke through hole 124 may be formed to have the same central axis.

When the coupling of the housing 110 and the upper yoke 120 is completed, the support member 420 may be coupled through the housing 110 and the upper yoke 120 (S120).

The base portion 421 of the support member 420 may be a portion having the largest diameter. As described above, before the shape is changed by an arbitrary tool such as a circular ring punch, the diameter of the base portion 421 may be smaller than the diameter of the upper yoke through hole 124.

Accordingly, the support member 420 may be smoothly coupled through the housing through hole 114 and the upper yoke through hole 124.

The support member 420 may be inserted up to a height at which one surface of the base portion 421 that is expanded radially outward can come in contact with an inner surface of the housing plane 113.

When the insertion of the support member 420 is completed, the arbitrary tool may be inserted into the first hollow portion 423 and the second hollow portion 424. The arbitrary tool may be used to apply radially outward pressure to the support member 420. The arbitrary tool may apply the pressure until the outer circumferential surface of the boss portion 422 is brought into contact with the inner circumferential surface of the upper yoke plane 123 surrounding the upper yoke through hole 124. Accordingly, the support member 420 may be expanded radially outward (S130).

Responsive to this, the first hollow portion 423 and the second hollow portion 424 may also be expanded radially outward. At the same time, the outer circumferential surfaces of the base portion 421 and the boss portion 422 may also be expanded radially outward.

When the expansion is completed, the outer circumferential surface of the boss portion 422 may be brought into contact with the inner circumferential surface of the upper yoke plane 123 surrounding the upper yoke through hole 124. At this time, the support member 420 may be brought into contact with the upper yoke plane 123 while applying the radially outward pressure to the inner circumferential surface of the upper yoke plane 123 by the arbitrary tool.

Accordingly, the support member 420 and the upper assembly 100 may be coupled to each other without a separate coupling member.

At this time, the housing through hole 114 may be formed to have a larger diameter than the upper yoke through hole 124. Accordingly, when the support member 420 is expanded radially outward, the outer circumferential surface of the support member 420 may first be brought into contact with the inner circumferential surface of the upper yoke plane 123 surrounding the upper yoke through hole 124.

Accordingly, even if the shape of the support member 420 is changed, the housing 110 may not be damaged.

(2) Description of Coupling Process (S200) Between Upper Assembly 100 and Lower Assembly 300

Hereinafter, a coupling process between the upper assembly 100 and the lower assembly 300 will be described in detail with reference to FIGS. 9, 10, 18, and 20.

As described above, the shaft support member 310 and the shaft 320 constituting the lower assembly 300 may be integrally formed by insert injection or the like (S210).

Figure 9:
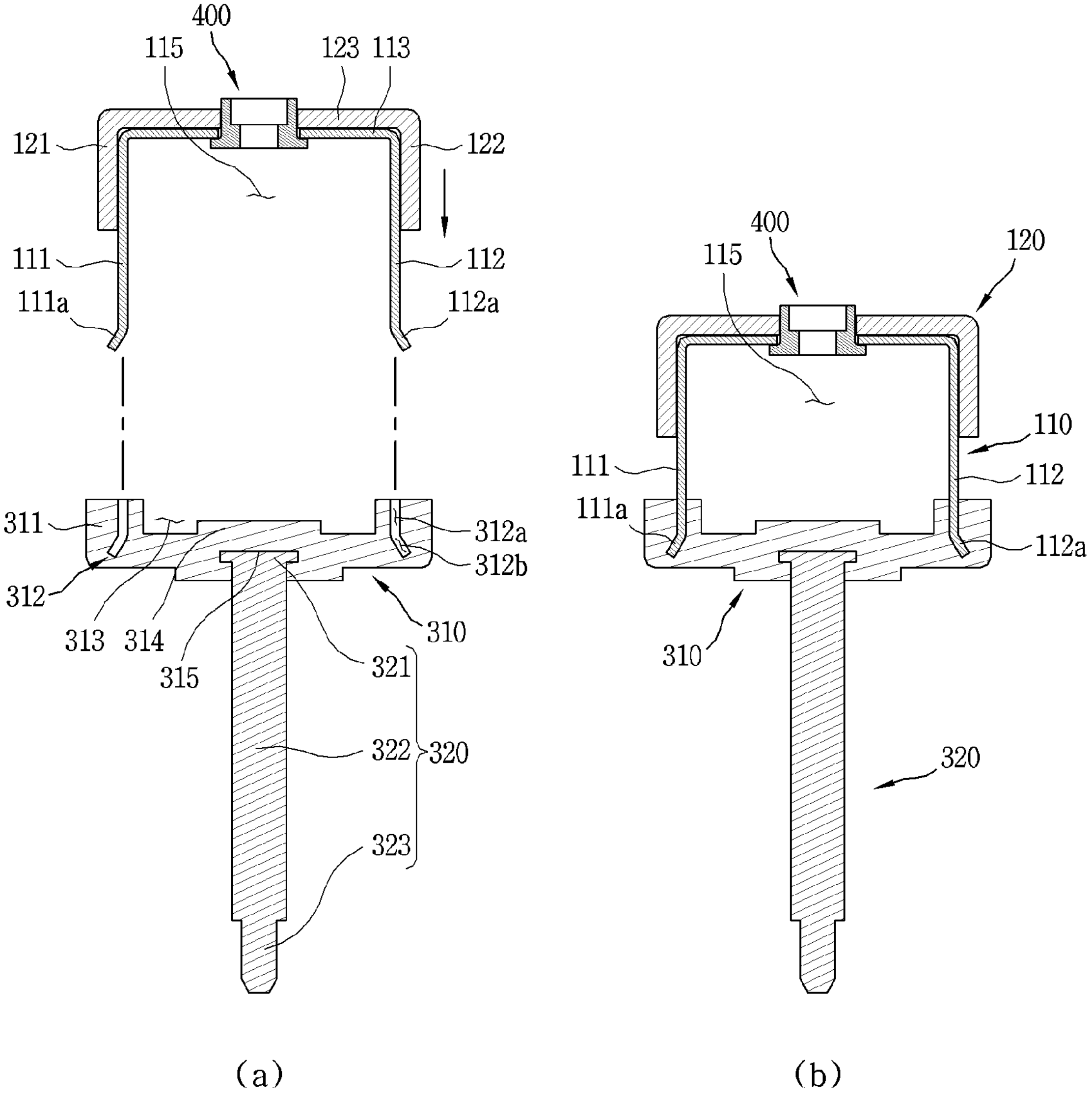
FIG. 9 is a cross-sectional view illustrating a state (a) before coupling the upper yoke, the housing, and a shaft body provided in the movable contactor part of FIG. 5, and a state (b) after coupling.
Figure 10:
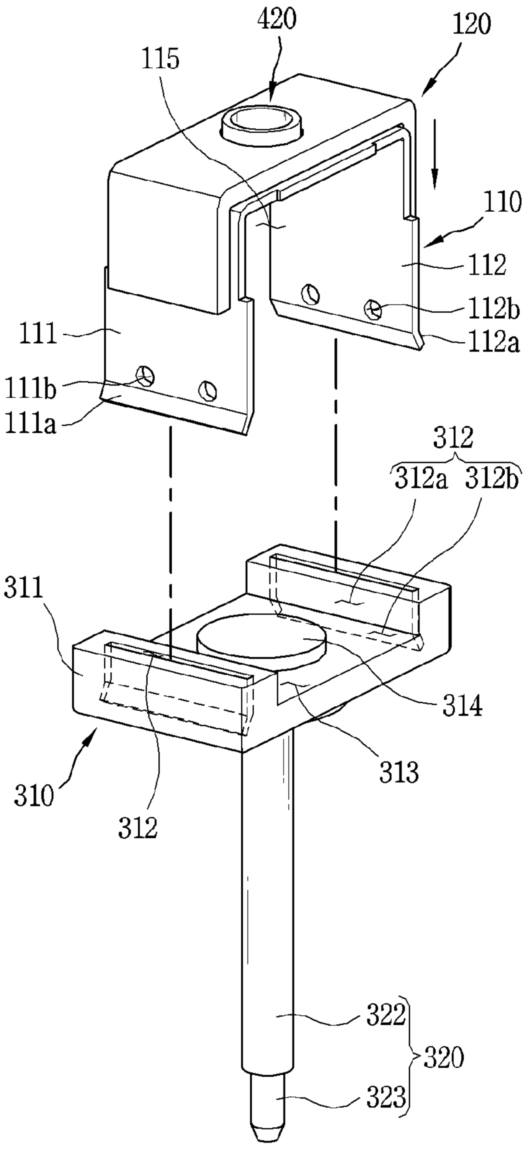
FIG. 10 is a perspective view illustrating the state (a) before coupling the upper yoke, the housing, and the shaft body provided in the movable contactor part of FIG. 5, and the state (b) after coupling.
Figure 10:
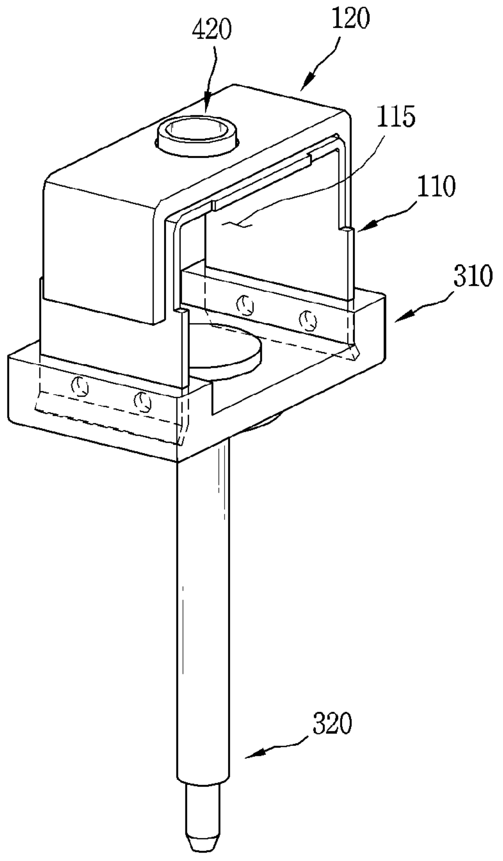
Figure 11:
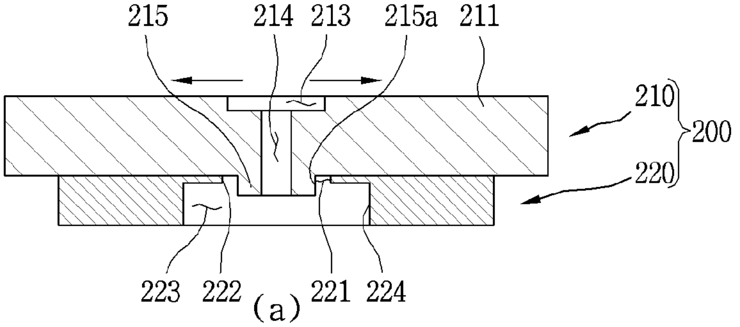
FIG. 11 is a cross-sectional view illustrating a state (a) before coupling a movable contactor and a lower yoke provided in the movable contactor part of FIG. 5 and a state (b) after coupling.
Figure 11:
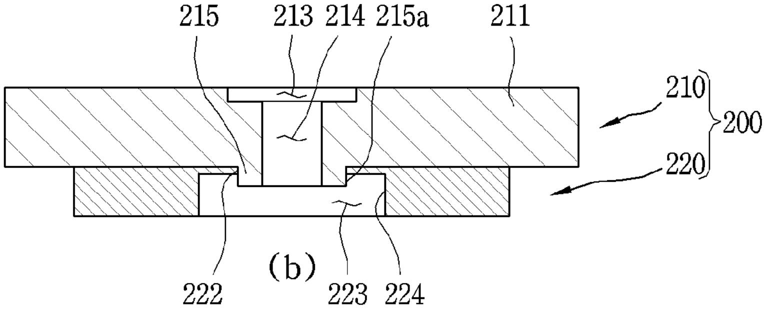
Figure 12:
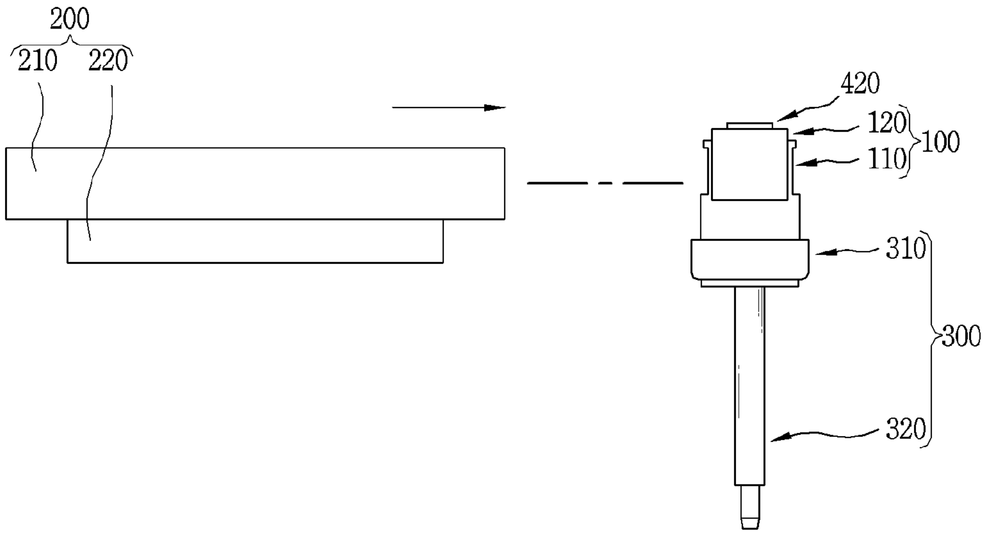
FIG. 12 is a lateral view illustrating a state (a) before coupling the movable contactor, the lower yoke, the upper yoke, the housing, and a shaft provided in the movable contactor part of FIG. 5, and a state (b) after coupling.
Figure 12:
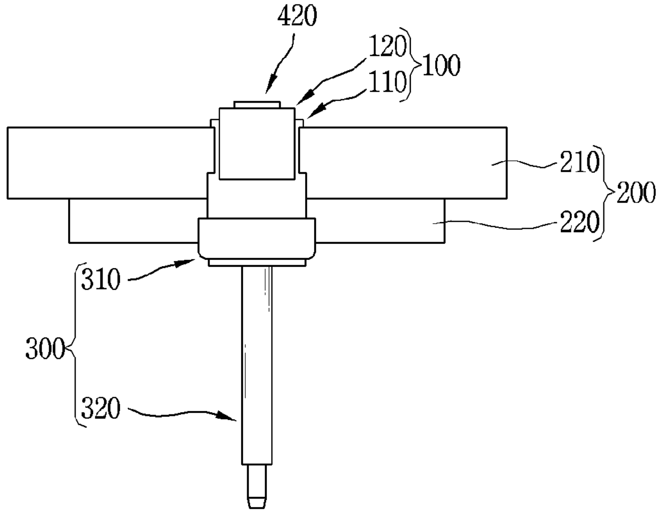
Figure 13:
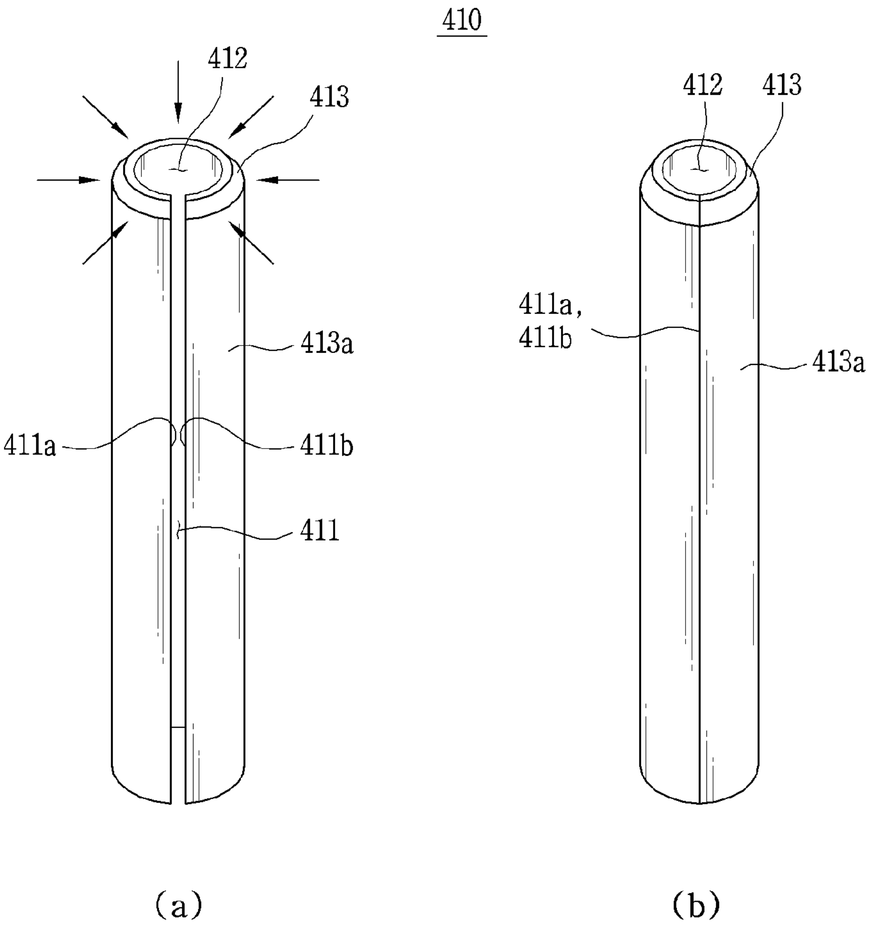
FIG. 13 is a perspective view illustrating states before (a) and after (b) a pin member provided in the movable contactor part of FIG. 5 is changed in shape due to external pressure.
Figure 14:
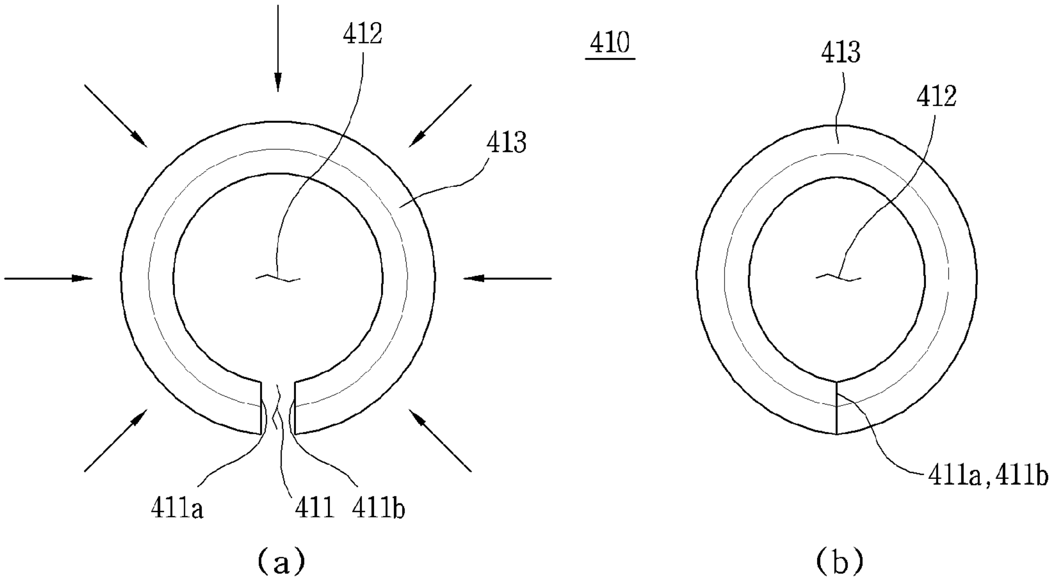
FIG. 14 is a planar view illustrating the states before (a) and after (b) the pin member provided in the movable contactor part of FIG. 5 is changed in shape due to the external pressure.
Figure 15:
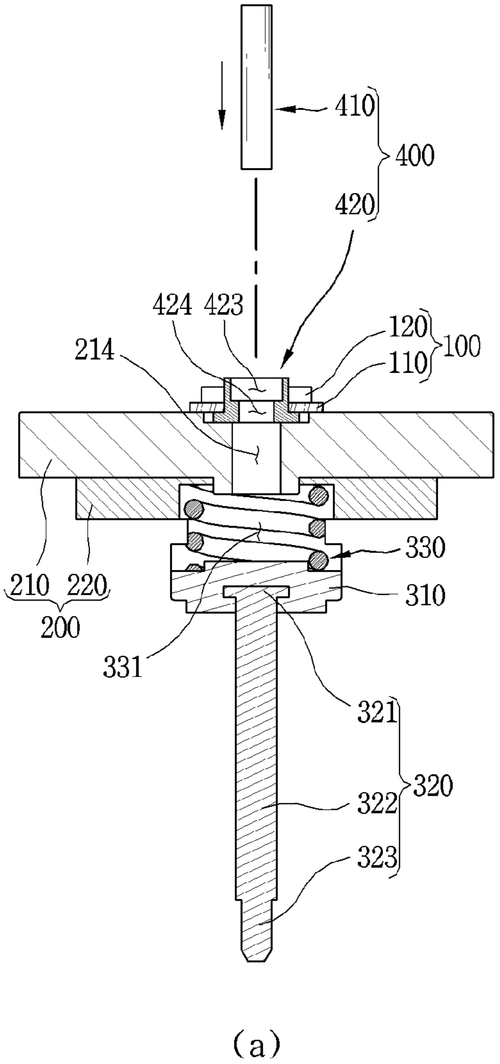
FIG. 15 is a front cross-sectional view illustrating a state (a) before coupling the movable contactor, the lower yoke, the upper yoke, the housing, the shaft, and the pin member provided in the movable contactor part of FIG. 5, and a state (b) after coupling.
Figure 15:
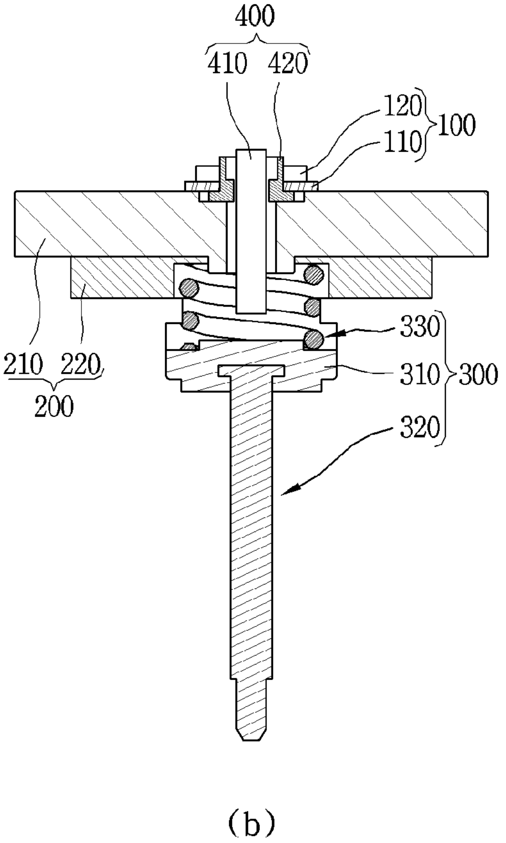
Figure 16:
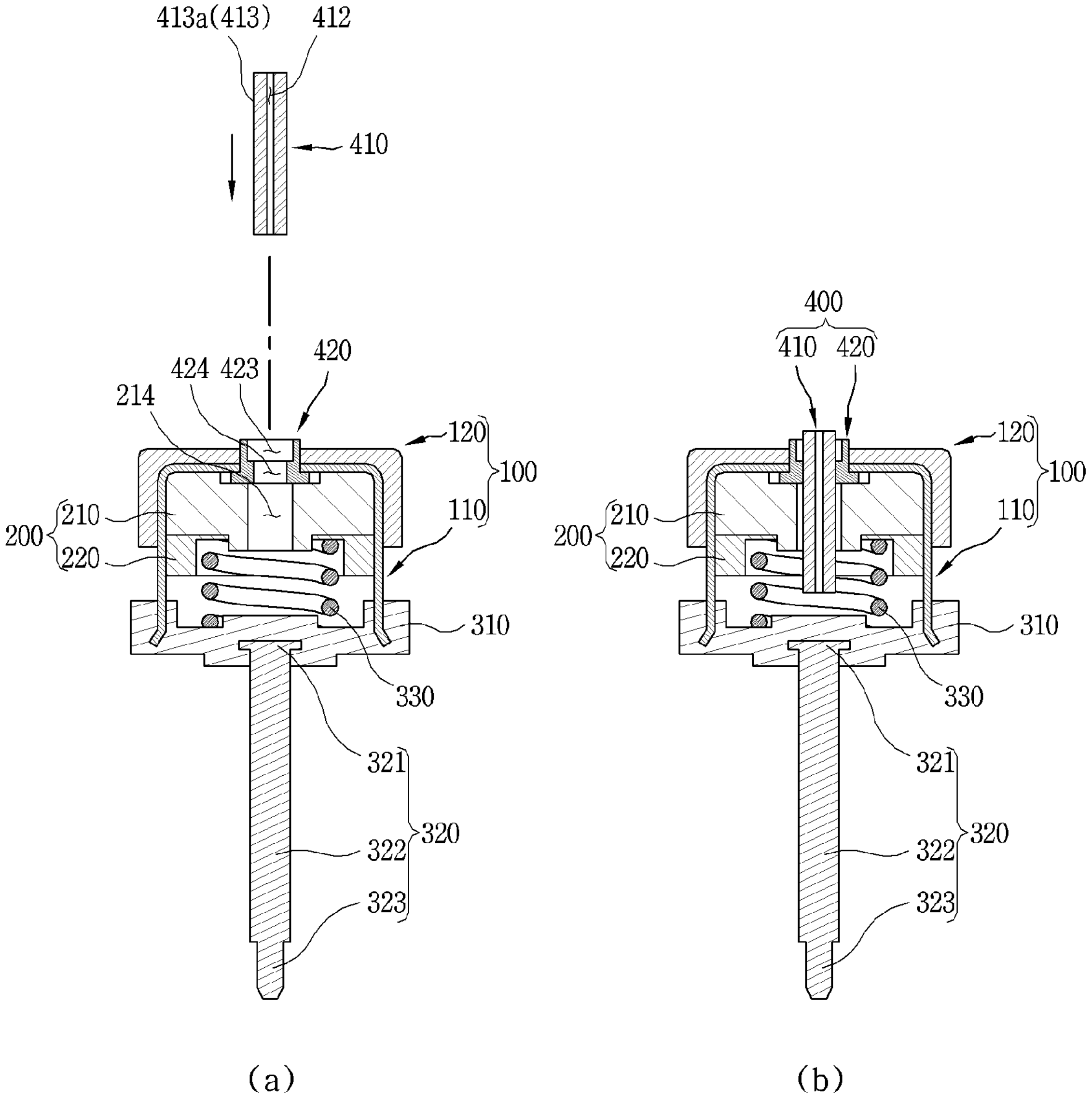
FIG. 16 is a lateral cross-sectional view illustrating the state (a) before coupling the movable contactor, the lower yoke, the upper yoke, the housing, the shaft, and the pin member provided in the movable contactor part of FIG. 5, and the state (b) after coupling.
Figure 17:
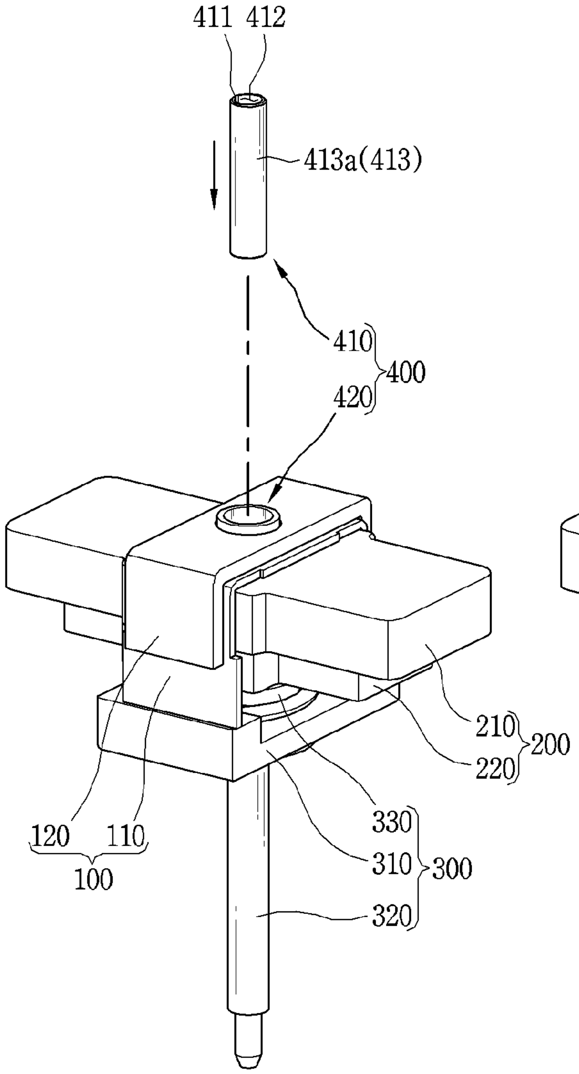
FIG. 17 is a perspective view illustrating the state (a) before coupling the movable contactor, the lower yoke, the upper yoke, the housing, the shaft, and the pin member provided in the movable contactor part of FIG. 5, and the state (b) after coupling.
Figure 18:
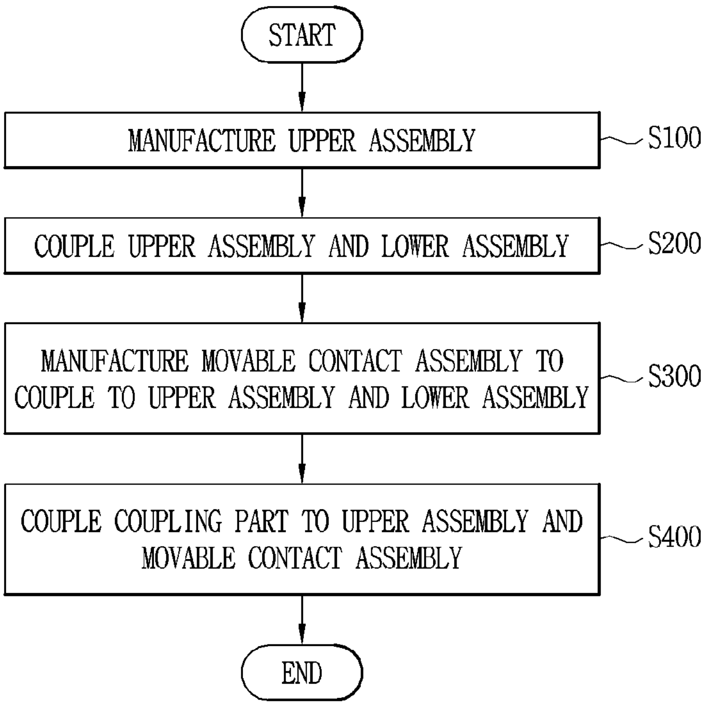
FIG. 18 is a flowchart illustrating a method for coupling a movable contactor part in accordance with one implementation of the present disclosure.
Figure 19:
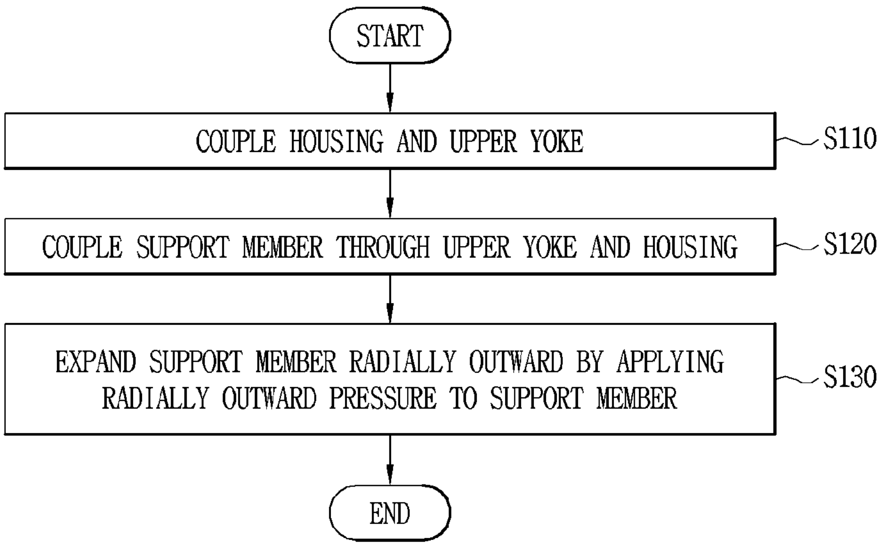
FIG. 19 is a flowchart illustrating detailed steps of step S100 of FIG. 18.
Figure 20:
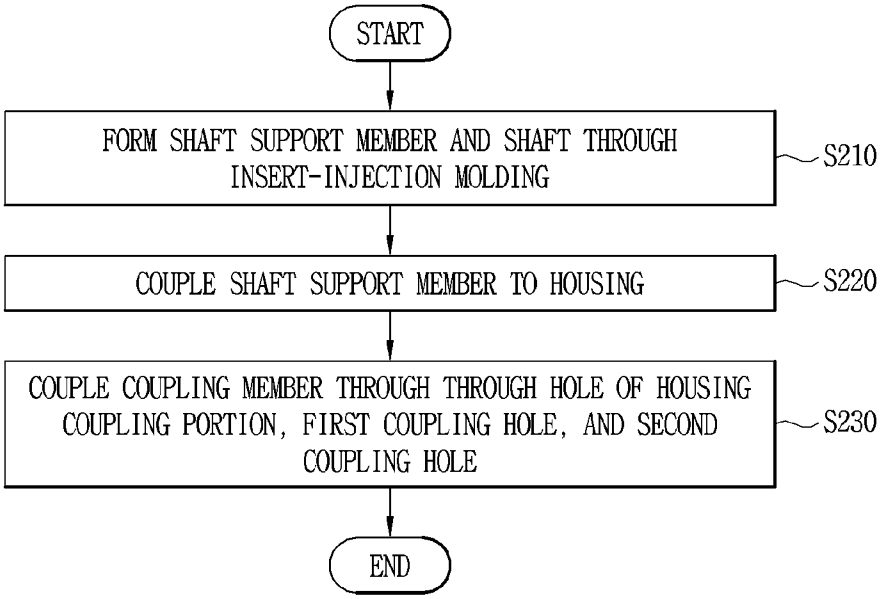
FIG. 20 is a flowchart illustrating detailed steps of step S200 of FIG. 18.
Figure 21:
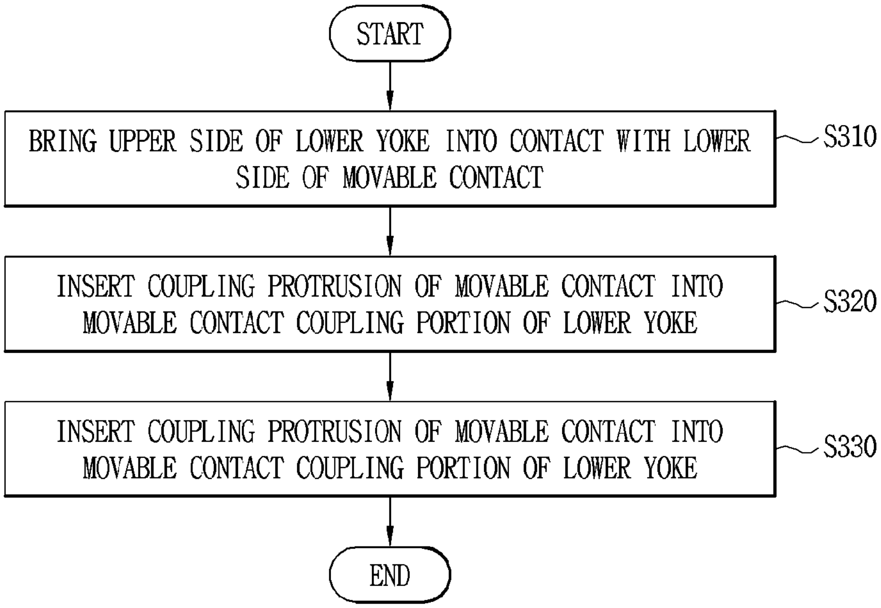
FIG. 21 is a flowchart illustrating detailed steps of step S300 of FIG. 18.
Figure 22:
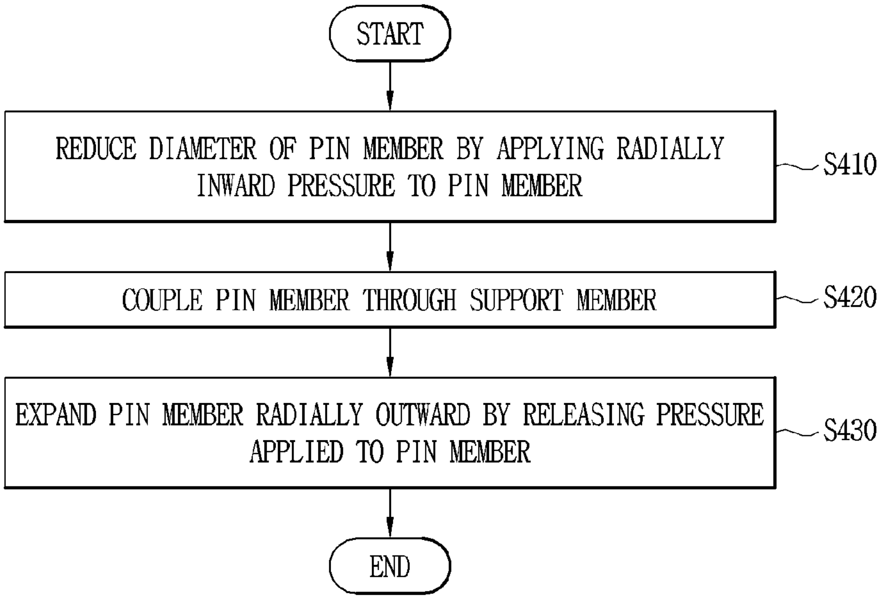
FIG. 22 is a flowchart illustrating detailed steps of step S400 of FIG. 18.

In addition, the elastic member 330 not illustrated in FIGS. 9 and 10 may be coupled together with the movable contactor assembly 200.

The first surface 111 and the second surface 112 of the housing 110 may be coupled to the housing coupling portions 311 of the shaft support member 310 (S220). Specifically, one end portion of the first surface 111 and one end portion of the second surface 112 that face the lower assembly 300 may be inserted into the coupling slits 312, respectively.

As aforementioned, the positions and shapes of the coupling slits 312 may be determined according to the positions and shapes of the first surface 111 and the second surface 112.

At this time, the first bent portion 111*a* and the second bent portion 112*a* may be formed respectively on the first surface 111 and the second surface 112. The first bent portion 111*a* and the second bent portion 112*a* may be inserted into the bent portions 312*b* through the vertical portions 312*a*, respectively.

As the first bent portion 111*a* and the second bent portion 112*a* are inserted into the bent portions 312*b* of the coupling slits 312, respectively, stable coupling may be achieved compared to a case where the housing 110 and the shaft support member 310 are coupled in the vertical direction.

Also, although not illustrated, through holes (not shown) may be formed through each housing coupling portion 311 in the back and forth direction. The through holes (not shown) may be aligned with the first coupling hole 111*b* and the second coupling hole 112*b* after the first surface 111 and the second surface 112 are inserted.

In addition, separate coupling members may be coupled through the through holes (not shown) and the coupling holes 111*b* and 112*b*, respectively (S230). In the implementation, the coupling between the housing 110 and the shaft support member 310 can be more firmly achieved.

(3) Description of Coupling Process (S300) of Movable Contactor Assembly 200

Hereinafter, a process of coupling the movable contactor assembly 200 and a process of coupling the movable contactor assembly 200 with the upper assembly 100 and the lower assembly 300 will be described in detail with reference to FIGS. 11, 12, 18, and 21.

The lower yoke 220 may be provided on the lower side of the movable contactor 210. The lower surface of the movable contactor 210 may come in contact with the upper surface of the lower yoke 220 (S310).

The support member accommodating portion 213 may be recessed in the upper surface of the movable contactor 210. In addition, the pin member coupling hole 214 may be formed through the movable contactor 210 in the height direction. The support member accommodating portion 213 and the pin member coupling hole 214 may communicate with each other.

The movable contactor coupling portion 221 may be formed through the radially inner side of the lower yoke 220 in the height direction. The coupling protrusion 215 of the movable contactor 210 may be inserted into the movable contactor coupling portion 221 (S320).

In this case, the diameter of the coupling protrusion 215 may be smaller than the diameter of the movable contactor coupling portion 221. Accordingly, the movable contactor 210 and the lower yoke 220 can be smoothly coupled to each other.

When the contact between the movable contactor 210 and the lower yoke 220 is completed, an arbitrary tool may be inserted into the support member accommodating portion 213 and the pin member coupling hole 214. The arbitrary tool may be used to apply radially outward pressure to the movable contactor 210. The arbitrary tool may apply pressure until the coupling outer circumferential surface 215*a* of the coupling protrusion 215 is brought into contact with the yoke inner circumferential surface 222. Accordingly, the coupling protrusion 215 of the movable contactor 210 may be expanded radially outward (S330).

Accordingly, the support member accommodating portion 213 and the pin member coupling hole 214 may also be expanded radially outward. At the same time, the coupling outer circumferential surface 215*a* may also be moved radially outward to be brought into contact with the yoke inner circumferential surface 222. At this time, the movable contactor 210 may be brought into contact with the coupling outer circumferential surface 215*a* while applying radially outward pressure to the coupling outer circumferential surface 215*a* by the arbitrary tool.

Accordingly, the movable contactor 210 and the lower yoke 220 may be coupled to each other without a separate coupling member.

The completely-coupled movable contactor assembly 200 may then be coupled to the upper assembly 100 and the lower assembly 300 that are coupled to each other through those processes. At this time, although not shown, the elastic member 330 may also be coupled.

As aforementioned, one side of the elastic member 330 facing the movable contactor assembly 200 may be inserted into the elastic member support portion 223 and another side of the elastic member 330 opposite to the one side may be supported by the elastic member coupling portion 314.

As described above, left and right sides of the housing 110 and the upper yoke 120 may be open. The movable contactor assembly 200 may be inserted through the left or right opening of the upper assembly 100 by the structure.

The movable contactor 210 and the lower yoke 220 may extend in the longitudinal direction. In addition, the extension lengths of the movable contactor 210 and the lower yoke 220 may be longer than the lengths of the housing 110 and the upper yoke 120 in the width direction (i.e., in the left and right direction in the illustrated implementation). Accordingly, both end portions of the movable contactor 210 and the lower yoke 220 in the longitudinal direction may be exposed to the outside.

When the coupling of the movable contactor assembly 200 is completed, the elastic member 330 may be located on the lower side of the movable contactor assembly 200. The elastic member 330 may elastically support the movable contactor assembly 200. Accordingly, even if electromagnetic repulsive force is generated between the fixed contactor 22 and the movable contactor 210, the fixed contactor 22 and the movable contactor 210 may not be arbitrarily separated from each other.

(4) Description of Coupling Process (S400) of Coupling Part 400

Hereinafter, a process in which coupling of the movable contactor part 40 is completed by coupling the coupling part 400 will be described in detail with reference to FIGS. 13 to 18 and 22.

Through those processes, the coupling of the upper assembly 100, the movable contactor assembly 200, and the lower assembly 300 may be completed. Since the movable contactor assembly 200 is elastically supported by the elastic member 330, arbitrary separation of the movable contactor 210 can be prevented to some extent.

In the movable contactor part 40 according to the implementation of the present disclosure, the movable contactor 210 can be more stably maintained in s the coupled state through the coupling part 400.

In addition, the coupling part 400 may stably maintain the coupled state between the housing 110 of the upper assembly 100 and the upper yoke 120.

Since the coupling process of the support member 420 of the coupling part 400 has been described above, the coupling process of the pin member 410 will be mainly described below.

Radially inward pressure may be applied to the pin member 410. Accordingly, the distance between the first end portion 411*a* and the second end portion 411*b* of the pin member 410 may be reduced. As a result, the diameter of the pin member 410 may be reduced (S410).

The pin member 410 may be inserted through the upper assembly 100 and the movable contactor assembly 200. Specifically, the pin member 410 may be inserted through the first hollow portion 423 and the second hollow portion 424 of the support member 420 and the pin member coupling hole 214 of the movable contactor 210.

Meanwhile, the support member 420 may be coupled through the housing 110 and the upper yoke 120. Accordingly, the pin member 410 may be inserted through the upper yoke through hole 124 and the housing through hole 114 with intervening the support member 420 therebetween.

At this time, the pin member 410 may be inserted into the support member 420 and the movable contactor 210 while receiving radially inward pressure (S420). The pressure may be applied by the aforementioned circular ring punch.

The cutout portion 411 may be formed in the pin member 410. Accordingly, the pin member 410 which receives the radially inward pressure may be deformed to be reduced in diameter. That is, the cross section of the pin member 410 may be reduced. As described above, the reduction may be compensated for by the cutout portion 411.

The reduction process may be performed until the diameter, namely, an outer diameter of the pin member 410 is equal to or smaller than the diameter of the second hollow portion 424. Preferably, the reduction process may be performed until the diameter of the pin member 410 becomes smaller than the diameter of the second hollow portion 424. Accordingly, the pin member 410 can be smoothly inserted into the support member 420.

The insertion of the pin member 410 may be continued until one end portion of the pin member 410, i.e., the lower end portion in the illustrated implementation is located in the elastic hollow portion 331 of the elastic member 330.

When the pin member 410 is inserted up to a desired depth, the pressure applied to the pin member 410 may be released. Accordingly, the pin member 410 may be expanded radially outward. That is, the pin member 410 may restored to its original shape (S430).

In this case, the diameter of the second hollow portion 424 may be smaller than the diameter of the pin member 410 before the shape of the pin member 410 changes. Accordingly, the expansion of the pin member 410 may be limited by the second hollow portion 424. As a result, the outer circumferential surface 413*a* of the pin member 410 may be brought into contact with the pin member contact surface 425 of the second hollow portion 424 while applying the radially outward pressure. That is, the pin member 410 may be press-fitted to the support member 420.

Accordingly, the pin member 410 and the support member 420 can be firmly coupled without a separate coupling member.

Also, there may be a case in which the pin member 410 is to be separated for maintenance or the like. In this case, the pin member 410 can be easily separated by simply applying radially inward pressure to the pin member 410.

The pin member 410 may be inserted through the movable contactor 210 and the lower yoke 220 so that the lower end portion thereof is located closer to the lower assembly 300 than the lower surface of the lower yoke 220. Accordingly, the movable contactor 210 can be more stably supported as compared to a case where only elastic support is provided by the elastic member 330.

Figure 23:
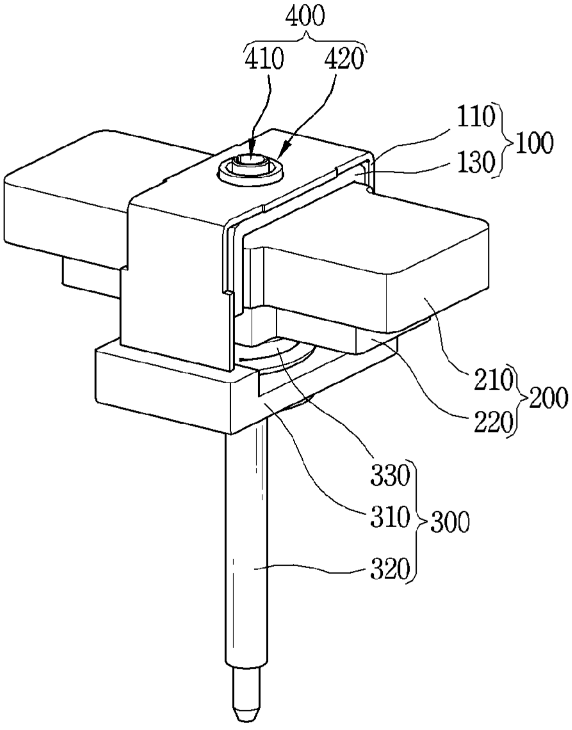
FIG. 23 is a perspective view illustrating a movable contactor part provided in a DC relay in accordance with another implementation of the present disclosure.
Figure 24:
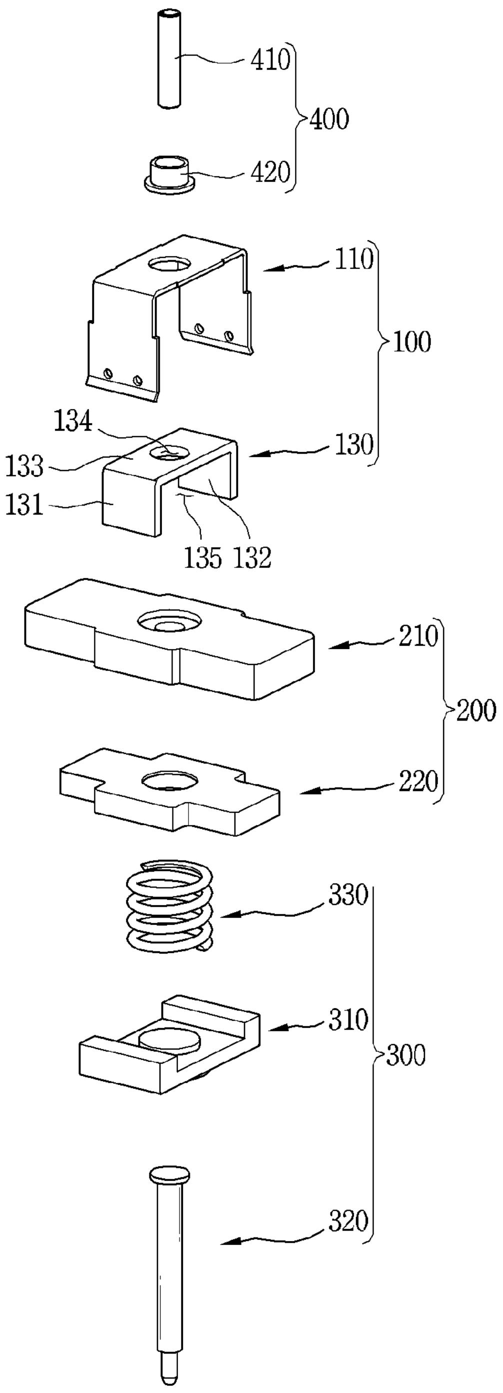
FIG. 24 is an exploded perspective view of the movable contactor part according to the implementation of FIG. 23.

5. Description of Movable Contactor Part 40 According to Another is Implementation Hereinafter, a detailed description will be given of a movable contactor part 40 according to another implementation of the present disclosure, with reference to FIGS. 23 and 24.

This implementation has a difference in coupling relationship between the housing 110 and the upper yoke 130 provided in the upper assembly 100 as compared with the foregoing implementation.

That is, the foregoing implementation illustrates that the upper yoke 120 is disposed on the outer side of the housing 110, whereas this implementation illustrates that the upper yoke 130 is disposed on an inner side of the housing 110.

Except for the difference, the structures of the movable contactor assembly 200, the lower assembly 300, and the coupling part 400 are the same as those in the foregoing implementation.

Accordingly, hereinafter, the upper yoke 130 and the coupling relationship between the upper yoke 130 and other components will be mainly described.

The upper yoke 130 may be located inside the housing 110. That is, the upper yoke 130 may be accommodated in the housing space 115. The shape of the upper yoke 130 may be similar to the shape of the upper yoke 120 according to the foregoing implementation.

However, an extension length of an upper yoke plane 133 of the upper yoke 130 may be shorter than the extension length of the housing plane 113. Specifically, the extension length of the upper yoke plane 133 may be equal to or shorter than the spaced distance between the first surface 111 and the second surface 112.

A first upper yoke surface 131 and a second upper yoke surface 132 may extend respectively from both end portions of the upper yoke plane 133 in the longitudinal direction, namely, from a front end portion and a rear end portion in the illustrated implementation.

The first upper yoke surface 131 and the second upper yoke surface 132 may extend at a predetermined angle with the upper yoke plane 133, respectively. In one implementation, the predetermined angle may be a right angle.

An outer surface of the first upper yoke surface 131 may come in contact with the inner surface of the first surface 111. An outer surface of the second upper yoke surface 132 may come in contact with the inner surface of the second surface 112. In addition, an upper surface of the upper yoke plane 133 may come in contact with the inner surface of the housing plane 113.

An upper yoke space 135 may be defined by the first upper yoke surface 131, the second upper yoke surface 132, and the upper yoke plane 133. The movable contactor assembly 200 may be accommodated in the upper yoke space 135.

That is, the upper yoke space 135 may be configured to function as the housing space 115 in the foregoing implementation.

An upper yoke through hole 134 may be formed through the upper yoke plane 133. The upper yoke through hole 134 may be formed through the upper yoke plane 133 in a height direction. Also, the upper yoke through hole 134 may be formed through a central portion of the upper yoke plane 133. The upper yoke through hole 134 may be disposed to have the same central axis as the housing through hole 114.

A diameter of the upper yoke through hole 134 may be larger than that of the housing through hole 114. In this case, the support member 420 may be press-fitted to the housing 110.

Alternatively, the diameter of the upper yoke through hole 134 may be smaller than the housing through hole 114. In this case, the support member 420 may be press-fitted to the upper yoke 130.

The support member 420 may be coupled sequentially through the housing through hole 114 and the upper yoke through hole 134. The process in which the support member 420 is expanded by an arbitrary tool to be coupled to the housing 110 or the upper yoke 130 may be the same as that described above.

Although it has been described above with reference to preferred embodiments of the present disclosure, it will be understood that those skilled in the art are able to variously modify and change the present disclosure without departing from the spirit and scope of the invention described in the claims below.

REFERENCE NUMERALS

1: DC relay
10: Frame part
11: Upper frame
12: Lower frame
13: Insulating plate
14: Supporting plate
20: Opening/closing part
21: Arc chamber
22: Fixed contactor
23: Sealing member
30: Core part
31; Fixed core
32: Movable core
32*a:* Protrusion
33: Yoke
34: Bobbin
35: Coil
36: Return spring
37: Cylinder
40: Movable contactor part
100: Upper assembly
110: Housing
111: First surface
111*a:* First bent portion
111*b:* First coupling hole
112: Second surface
112*a:* Second bent portion
112*b:* Second coupling hole
113: Housing plane
114: Housing through hole
115: Housing space
120: Upper yoke
121: First upper yoke surface
122: Second upper yoke surface
123: Upper yoke plane
124: Upper yoke through hole
130: Upper yoke
131: First upper yoke surface
132: Second upper yoke surface
133: Upper yoke plane
134: Upper yoke through hole
135: Upper yoke space
200: Movable contactor assembly
210: Movable contactor
211: Body portion
212: Protruding portion
213: Support member accommodating portion
214: Pin member coupling hole
215: Coupling protrusion
215*a:* Coupling outer circumferential surface
220: Lower yoke
221: Movable contactor coupling portion
222: Yoke inner circumferential surface
223: Elastic member support portion
224: Main inner surface
300: Lower assembly
310: Shaft support member
311: Housing coupling portion
312: Coupling slit
312*a:* Vertical portion
312*b:* Bent portion
313: Elastic member accommodating portion
314: Elastic member coupling portion
315: Shaft coupling portion
320: Shaft
321: Head portion
322: Shaft body portion
323: Movable core support portion
330: Elastic member
331: Elastic hollow portion
400: Coupling part
410: Pin member
411: Cutout portion
411*a:* First end portion
411*b:* Second end portion
412: Hollow portion
413: Outer circumferential portion
413*a:* Outer circumferential surface
420: Support member
421: Base portion
422: Boss portion
422*a:* Boss portion inner circumferential surface
423: First hollow portion
424: Second hollow portion
425: Pin member contact surface
1000: DC relay according to the related art
1100: Frame part according to the related art
1110: Upper frame according to the related art
1120; Lower frame according to the related art
1200: Contact part according to the related art
1210: Fixed contact according to the related art
1220: Movable contact according to the related art
1300: Actuator according to the related art
1310: Coil according to the related art
1320: Bobbin according to the related art
1330: Fixed core according to the related art
1340: Movable core according to the related art
1350: Movable shaft according to the related art
1360: Spring according to the related art
1400: Movable contact moving part according to the related art
1410: Movable contact supporting portion according to the related art
1420: Movable contact Cover portion according to the related art
1430: Elastic portion according to the related art

The invention claimed is:

1. A Direct Current (DC) relay comprising:
a fixed contactor;
a movable contactor brought into contact with or separated from the fixed contactor to be electrically connected to or disconnected from the fixed contactor;

an upper yoke located on an upper side of the movable contactor to cancel electromagnetic repulsive force generated between the fixed contactor and the movable contactor;

a support member coupled to the upper yoke and the movable contactor such that the upper yoke and the movable contactor are coupled to each other; and a pin member coupled through the support member to support the movable contactor, wherein the pin member extends in a longitudinal direction, and wherein the pin member comprises:

a first end portion constituting one end portion of an outer circumference of the pin member; and a second end portion opposite to the first end portion, spaced apart from the first end portion by a predetermined distance, and constituting another end portion of the outer circumference of the pin member.

2. The direct current relay of claim 1, wherein the support member extends in a height direction, and wherein a first hollow portion and a second hollow portion having a smaller diameter than the first hollow portion are formed through an inside of the support member in the height direction.

3. The direct current relay of claim 2, wherein an outer circumferential surface of the pin member is brought into contact with a pin member contact surface surrounding the second hollow portion when the pin member is coupled through the support member.

4. The direct current relay of claim 1, wherein the distance between the first end portion and the second end portion is reduced and an outer diameter of the pin member is reduced accordingly when radially inward pressure is applied to the pin member.

5. The Direct-Current (DC) relay of claim 1, wherein an outer diameter of the pin member is larger than a diameter of the second hollow portion.

6. The direct current relay of claim 1, further comprising a lower yoke located on a lower side of the movable contactor to cancel electromagnetic repulsive force generated between the fixed contactor and the movable contactor, wherein electromagnetic attractive force is generated between the upper yoke and the lower yoke when the fixed contactor and the movable contactor are in contact to be electrically connected to each other.

7. The direct current relay of claim 6, wherein the movable contactor comprises a coupling protrusion protruding toward the lower yoke, wherein the lower yoke comprises a movable contactor coupling portion recessed by a predetermined distance into one surface of the lower yoke facing the movable contactor to surround the coupling protrusion, and wherein a diameter of the coupling protrusion is smaller than a diameter of the movable contactor coupling portion.

8. The direct current relay of claim 7, wherein the diameter of the coupling protrusion is increased so that an outer circumferential surface of the coupling protrusion is brought into contact with a yoke inner circumferential surface surrounding the movable contactor coupling portion when radially outward pressure is applied to the coupling protrusion.

9. The direct current of claim 1, further comprising a housing located between the movable contactor and the upper yoke to accommodate the movable contactor, wherein the upper yoke surrounds the housing.

10. The direct current relay of claim 1, further comprising a housing located on an upper side of the upper yoke to surround the upper yoke.

* * * * *